US012656994B2

(12) United States Patent
Lee et al.

(10) Patent No.: US 12,656,994 B2
(45) Date of Patent: Jun. 16, 2026

(54) DISPLAY DEVICE, VEHICLE HAVING THE SAME, AND CONTROL METHOD FOR VEHICLE

(71) Applicant: LG ELECTRONICS INC., Seoul (KR)

(72) Inventors: Kyoungha Lee, Seoul (KR); Zhi Min Choo, Seoul (KR); In Young Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 119 days.

(21) Appl. No.: 18/690,538

(22) PCT Filed: Sep. 7, 2022

(86) PCT No.: PCT/KR2022/013441
§ 371 (c)(1),
(2) Date: Aug. 20, 2024

(87) PCT Pub. No.: WO2023/038428
PCT Pub. Date: Mar. 16, 2023

(65) Prior Publication Data
US 2025/0341999 A1 Nov. 6, 2025

(30) Foreign Application Priority Data

Sep. 9, 2021 (KR) ........................ 10-2021-0120277
Jan. 4, 2022 (KR) ........................ 10-2022-0000838
Jan. 4, 2022 (KR) ........................ 10-2022-0000839

(51) Int. Cl.
*G06F 3/14* (2006.01)
*B60R 13/08* (2006.01)
(Continued)

(52) U.S. Cl.
CPC ........ *G06F 3/1446* (2013.01); *B60R 13/0823* (2013.01); *G06F 3/011* (2013.01); *B60R 1/27* (2022.01); *B60R 2300/20* (2013.01)

(58) Field of Classification Search
CPC ... G06F 3/1446; G06F 3/011; B60R 13/0823; B60R 1/27; B60R 2300/20
See application file for complete search history.

(56) References Cited

U.S. PATENT DOCUMENTS

2004/0036769 A1* 2/2004 Sadahiro .................. H04N 7/18
348/148
2014/0085337 A1 3/2014 Velten et al.
(Continued)

FOREIGN PATENT DOCUMENTS

DE 10 2014 208 740 A1 11/2015
DE 10 2019 212 776 A1 3/2021
(Continued)

*Primary Examiner* — Premal R Patel
(74) *Attorney, Agent, or Firm* — Birch, Stewart, Kolasch & Birch, LLP

(57) ABSTRACT

A display device for a vehicle includes a first display disposed in a first direction in an inner space of a vehicle, and a second display disposed in a second direction in the inner space of the vehicle. The inner space is divided into a first zone and a second zone, and the first display and the second display are configured to be movable between the first zone and the second zone.

14 Claims, 38 Drawing Sheets

(51) Int. Cl.
   *G06F 3/01*      (2006.01)
   *B60R 1/27*      (2022.01)

(56) References Cited

U.S. PATENT DOCUMENTS

| | | | | |
|---|---|---|---|---|
| 2014/0313137 A1* | 10/2014 | Cho | ........................ | G06F 3/041 |
| | | | | 345/173 |
| 2015/0138449 A1* | 5/2015 | Rawlinson | ............. | B60N 2/003 |
| | | | | 348/837 |
| 2016/0321024 A1 | 11/2016 | Jin et al. | | |
| 2016/0355133 A1* | 12/2016 | Kim | .................... | G06F 3/04883 |
| 2018/0194227 A1 | 7/2018 | Gussen et al. | | |
| 2019/0092170 A1 | 3/2019 | Gassman et al. | | |
| 2019/0176626 A1 | 6/2019 | Akaike et al. | | |
| 2019/0281340 A1 | 9/2019 | Sacra | | |
| 2020/0070736 A1* | 3/2020 | Kim | ........................ | B60K 35/29 |
| 2021/0023946 A1 | 1/2021 | Johnson et al. | | |
| 2022/0097524 A1* | 3/2022 | Choi | ........................ | B60Q 1/50 |
| 2022/0134877 A1* | 5/2022 | Larry | .................. | G06V 40/103 |
| | | | | 701/1 |

FOREIGN PATENT DOCUMENTS

| | | | |
|---|---|---|---|
| KR | 10-2028720 | B1 | 11/2019 |
| KR | 10-2019-0140806 | A | 12/2019 |
| KR | 10-2174863 | B1 | 11/2020 |
| KR | 10-2232646 | B1 | 3/2021 |
| WO | WO2020/032304 | A1 | 2/2020 |
| WO | WO2020/204225 | A1 | 10/2020 |

* cited by examiner

| Passenger | Passenger information | Registration status | Rating | Passenger terminal |
|-----------|----------------------|---------------------|--------|--------------------|
| 1 | A | Registration | Level 1 | T1 |
| 2 | B | Not registered | Level 2 | --- |

DISPLAY DEVICE, VEHICLE HAVING THE SAME, AND CONTROL METHOD FOR VEHICLE

CROSS REFERENCE TO RELATED APPLICATIONS

This application is the National Phase of PCT International Application No. PCT/KR2022/013441, filed on Sep. 7, 2022, which claims priority under 35 U.S.C. 119(a) to Korean Patent Application No. 10-2021-0120277, filed in the Republic of Korea on Sep. 9, 2021, Korean Patent Application No. 10-2022-0000838, filed in the Republic of Korea on Jan. 4, 2022, and Korean Patent Application No. 10-2022-0000839, filed in the Republic of Korea on Jan. 4, 2022, all of which are hereby expressly incorporated by reference into the present application.

TECHNICAL FIELD

The present disclosure relates to a display device having a plurality of displays in an inner space of a vehicle, a vehicle having the display device, and a method of controlling the vehicle.

BACKGROUND ART

The vehicle is now evolving from a simple means of transportation into a completely new mobility concept, such as an autonomous vehicle, by combining newly developed IT technology.

An autonomous vehicle refers to a vehicle capable of self-driving by setting a driving route by sensing a driving environment of a vehicle without human intervention.

The automation level of the autonomous vehicles may be divided into six levels, ranging from Level 0 to Level 5 according to a guideline (J3016) suggested by the Society of Automotive Engineers (SAE).

With the rapid advancement of autonomous driving technology, it is expected to progress beyond Level 3 (Conditional Automation) into SAE Level 4 (High Automation) and SAE Level 5 (Full Automation) in the near future.

In line with this, the inner space of the autonomous vehicle is transformed into another living space. For example, the inner space of the vehicle is transformed into a concept of evolving into an office, shopping mall, gym, movie theater, and the like. In particular, as interest in the inner structure and interior of the vehicle increases, it is expected that there will be more interest in the interior of vehicles than in their exterior.

As mentioned above, the concept of mobility is also changing because the autonomous vehicle is no longer a simple means of transportation, but has a variety of purposes, especially in the inner environment.

In recent years, a multi-functional display device has been developed and installed in a vehicle to change the inner environment of a vehicle and support diversity of an in-car service through a display.

For example, Korean Patent Publication No. 10-2019-0140806 (Prior Art 1) discloses a display device for an autonomous vehicle, which is adjusted to move between a first position in which a plurality of display screens are arranged to face the ceiling or floor of a vehicle and a second position in which the screen faces each of the seats facing each other.

Korean Patent Publication No. 10-2014-0133838 (Prior Art 2) discloses a device designed to show the status of a vehicle's autonomous driving by receiving information on the autonomous driving condition and presenting it on a display device.

Korean Patent Registration No. 10-2179289 (Prior Art 3) discloses a large display interaction system and method for an autonomous vehicle, in which motion data is generated by detecting the motion of a passenger, and the extended display is controlled according to the generated motion data or the driving information-related content is provided to the extended display.

Korean Patent Publication No. 10-2021-0150701 (Prior Art 4) discloses a display device for a vehicle in which a first display part and a transparent second display part are installed to be spaced apart from each other in front of a driver, and a driver recognizes first and second images displayed on each display part as an overlapped image.

However, in the prior art, including the prior art documents 1 to 4, the display part simply displays the vehicle information and the surrounding information and is merely an auxiliary function of the autonomous driving system.

In order to provide an in-car service suitable for various purposes in the future autonomous vehicle, research and development are required to address changes in the inner environment, structure, and design of vehicles.

DETAILED DESCRIPTION OF THE DISCLOSURE

Technical Problem

An object of the present disclosure is to provide a display device, a vehicle having the display device, and a method of controlling the vehicle, in which the display device may provide an inner environment of a vehicle suitable for various purposes.

Another object of the present disclosure is to provide a display device, a vehicle having the display device, and a method of controlling the vehicle, in which a plurality of displays may independently display different screens or may extend and display some screens.

Another object of the present disclosure is to provide a display device, a vehicle having the display device, and a method of controlling the vehicle, in which the display is configured to be movable according to a position of a passenger.

Another object of the present disclosure is to provide a display device, a vehicle having the display device, and a method of controlling the vehicle, in which a screen corresponding to a position of a passenger may be displayed on a display.

Another object of the present disclosure is to provide a display device, a vehicle having the display device, and a method of controlling the vehicle, in which a display may be operated through the passenger's voice, gesture, and knock-on.

Another object of the present disclosure is to provide a display device, a vehicle having the display device, and a method of controlling the vehicle, in which a display capable of displaying a surrounding environment of a vehicle is provided.

Another object of the present disclosure is to provide a display device, a vehicle having the display device, and a method of controlling the vehicle, in which products for convenience of passengers are provided in the inner space of a vehicle so that passengers may use the products according to their needs.

Another object of the present disclosure is to provide a display device, a vehicle having the display device, and a method of controlling the vehicle, in which, a behavior and a status of a passenger in the inner space of the vehicle may be detected, and an operation of the vehicle may be controlled according to the detected behavior and status.

Another object of the present disclosure is to provide a display device, a vehicle having the display device, and a method of controlling the vehicle, in which a passenger's voice is recognized, and the vehicle may be operated to correspond to the voice.

Another object of the present disclosure is to provide a display device, a vehicle having the display device, and a method of controlling the vehicle, in which a plurality of displays are provided in the inner space of a vehicle, and screens are displayed on the displays in response to the behaviors and status of the passenger.

Another object of the present disclosure is to provide a display device, a vehicle having the display device, and a method of controlling the vehicle, in which an operation of a vehicle is different according to a position of a passenger in the inner space of the vehicle.

Technical Solution

A display device according to an embodiment of the present disclosure may include a plurality of displays installed in an inner space of a vehicle. A first display of the plurality of displays may be installed on a side portion of the inner space in a first direction, and a second display may be installed on an upper portion of the inner space in a second direction different from the first direction. In this case, the first display and the second display may be coupled to each other by a coupling means or may be integrally formed with each other. The angle formed by the first direction and the second direction may be 80 to 110 degrees, preferably perpendicular to each other. The display device may include a processor configured to control a screen for display on the plurality of displays.

The inner space of the vehicle may be divided into a plurality of zones. For example, the inner space of the vehicle may be divided into front and rear directions of the vehicle. In this embodiment, for example, a first zone and a second zone may be divided into a first zone and a second zone. The first display and the second display may be installed to be movable between the first zone and the second zone. When a first condition for moving the first and second displays is satisfied, the processor may control a driving part to move the first and second displays between the first zone and the second zone. The processor may control a first image to be displayed on the first display and a second image subsequent to the first image to be extended and displayed on the second display. That is, a portion of the content displayed on the first display is displayed on the second display.

The vehicle may further include a third display installed in the first zone in a third direction opposite to the second direction in a lower portion of the inner space. A third image may be displayed on the third display. When the first and second displays are in the first zone, the processor may control the third image subsequent to the first image to be extended and displayed on the third display.

The vehicle may further include a fourth display installed in the first zone in the first direction at a side portion of the inner space. A fourth image may be displayed on the fourth display. The processor may control the fourth image subsequent to the first image to be extended and displayed on the fourth display. In addition, when a plurality of buttons are displayed on the fourth display and a button is touched, the processor may control one of the first through the third images to be manipulated.

In this way, by displaying the second, third, and fourth images on the second, third, and fourth displays, respectively, extending the first image displayed on the first display, passengers may feel as if they are in the depicted environment and experience a sense of realism as the images surround them on the sides, top, and bottom of the vehicle's inner space.

The vehicle may further include a fifth display installed in the second zone in a fourth direction orthogonal to the first and second directions in the inner space. A fifth image may be displayed on the fifth display. The size of the fifth display may be changed. The processor may control the first and second images, which are subsequent to the fifth image, to be displayed on the first and second displays respectively, by extending from the fifth image. Accordingly, by displaying a movie-like main image on the fifth display and displaying the images extended from the main image on the first and second displays, the passenger may view the image more realistically.

The vehicle may further include a sixth display installed on an outer front surface of the vehicle toward the front of the vehicle. A sixth image may be displayed on the sixth display. In addition, the vehicle may further include a seventh display installed on an outer rear surface toward the rear of the vehicle. A seventh image may be displayed on the seventh display.

The processor may control such that the first image is displayed on the first display and the second image subsequent to the first image is displayed on the second display by extending from the first image. The first image becomes the main image and the second image is an extension of the main image, so it is possible to further extend the main image around the periphery. In this case, the extended image may be a part of the entire main image.

The vehicle may further include a voice recognition part configured to recognize a voice of the passenger. When a request to move the first and second displays is input through the voice recognition part, the processor may control the driving part to move the first and second displays between the first zone and the second zone.

The vehicle may further include a communication part configured to communicate with an external device. When a request to move the first and second displays is input through the communication part, the processor may control the driving part to move the first and second displays between the first zone and the second zone.

The vehicle may further include a first sensing part configured to detect a passenger in the first zone and a second sensing part configured to detect a passenger in the second zone. In a state where the first and second displays are in the first zone, if the first sensing part does not detect a passenger in the first zone, yet and the second sensing part detects a passenger in the second zone, the processor may control the driving part to move the first and second displays to the second zone.

In a state where the first and second displays are in the second zone, if the second sensing part does not detect a passenger in the second zone, yet the first sensing part detects a passenger in the first zone, the processor may control the driving part to move the first and second displays to the first zone. The first and second sensing parts may include at least one of a face recognition sensor, a fingerprint recognition sensor, an iris recognition sensor, an image recognition sensor, and an NFC sensor.

In the initial state, the first and second displays are positioned in the first zone and are on standby. When a door is unlocked and opened in the standby state and when a request to move the first and second displays is input, the driving part is executed to move the first and second displays in the first zone to the second zone. When the door is closed and locked in a state in which the first and second displays are in the second zone, the driving part is executed to move the first and second displays back to the first zone.

A portion of one side surface of the inner space of the vehicle may be open, and a door may be installed to open and close for opening and closing the open portion of the vehicle.

In addition, the vehicle may be controlled in response to a behavior or a status of the passenger. The vehicle may be an inner combustion engine vehicle, a hybrid vehicle, an electric vehicle, or a hydrogen fuel cell vehicle, and preferably, an autonomous vehicle that is driven autonomously without a passenger manipulation.

The vehicle may detect a passenger in the first zone and the second zone, and may sense and analyze a behavior and a status of the passenger. In addition, the vehicle may operate in response to the analyzed behavior and status. In this embodiment, the rear of the inner space in the front-to-rear direction of the vehicle becomes the first zone (Zone 1) and the front becomes the second zone (Zone 2).

Each of the first zone and the second zone may be a concept of a first inner space and a second inner space in the inner space, or may be a concept of an area formed in the first and second inner spaces. The first zone and the second zone may be spaces for different purposes, and may have an environment and design suitable for each purpose. For example, the first zone may be a space for relaxation and entertainment, and the second zone may be a space for driving and an office.

The first and second displays may be moved between the first zone and the second zone depending on the position of the passenger. The first and second displays may be moved at the passenger's request.

A plurality of sensors, a camera, and an input/output part may be installed in the vehicle. These sensors and cameras may detect whether a passenger is getting on or off, the position of the passenger, and the behavior and status of the passenger. The result sensed by the sensors and the cameras may be transmitted to the processor and the processor may control the operation of the vehicle using the sensed result. That is, the processor may control the vehicle such that operations corresponding to the behavior and the status of the passenger are performed in the vehicle according to the position of the passenger.

When the vehicle's sensor or the camera detects the blink of the passenger, the processor may determine whether the passenger is drowsy and control the vehicle to perform a drowsiness awakening operation. In this case, different operations may be performed depending on whether the passenger is in the first zone or the second zone.

When the vehicle's sensor or the camera detects the heart rate of the passenger, the processor may determine whether the passenger is abnormal. When an abnormality occurs in the passenger, the processor may control the vehicle to perform an operation for safety.

When the vehicle's sensor or the camera detects a shoe on/off state of the passenger, the processor may control the vehicle to perform an operation for shoe replacement. When the vehicle's sensor or the camera detects the passenger's fanning gesture, the processor may control the vehicle to perform an operation for adjusting the temperature of the inner space. In this case, the temperature of the inner space may be referred to. In order to control the temperature, the air conditioning system may be operated.

When the vehicle's sensor or the camera detects the passenger's voice, the processor may control the vehicle to perform an operation corresponding to the voice. The voice may include a specific word, and the processor may perform an operation corresponding to a specific word. For example, when a voice related to "hot" is recognized, the air conditioning system may be activated. Alternatively, when a voice related to music is recognized, music may be output.

When the vehicle's sensor or the camera detects that a passenger is eating, the processor may control the vehicle to create a comfortable eating environment in the first zone and may control the vehicle to output a warning message for safety in the second zone.

When the vehicle's sensor or the camera detects the passenger's chest pounding, sighing, or heart rate abnormality, the vehicle may control the operation of the vehicle to provide cooling or stabilization.

Advantageous Effects

A display device, a vehicle having the display device, and a method of controlling the vehicle according to the embodiment of the present disclosure may have the following effects.

According to the present disclosure, an environment suitable for various purposes may be provided for the inner space of the vehicle.

According to the present disclosure, since images suitable for various purposes may be displayed on the display, the inner space of the vehicle may be utilized as an environment desired by the passenger.

According to the present disclosure, a plurality of displays may independently display different images, or some images may be linked or extended and displayed, thereby providing various enjoyment to the passenger.

According to the present disclosure, the plurality of displays are configured to be movable according to the passenger's position and requests, thereby enhancing the convenience of use for the passenger.

The present disclosure enables the passenger to quickly and conveniently change a desired image by recommending and displaying content suitable for the position of the passenger.

The present disclosure may be simple and convenient to use because the display may be operated by the passenger's voice, gesture, and knock-on.

The present disclosure may display the surrounding environment of the vehicle on the multiple displays so that the surrounding environment of the vehicle may be seen from various angles, allowing the passenger to see the environment from inside the vehicle.

The present disclosure may include displays mounted on the front and rear of the vehicle to display the status information of the vehicle on the front and rear displays, allowing people outside the vehicle to check the status information, thereby reducing the risk of accidents.

According to the present disclosure, products for passenger convenience may be provided in the inner space of the vehicle, and the products may be used according to the requirements of the passenger.

According to the present disclosure, a behavior and a status of the passenger in the inner space of the vehicle may be detected, and the vehicle may operate according to the detected behavior and status.

According to the present disclosure, the vehicle may recognize the passenger's voice and operate to respond to the voice.

According to the present disclosure, a plurality of displays may be provided in the inner space of the vehicle to display images on the displays in response to the behavior and the status of the passenger.

According to the present disclosure, the operation of the vehicle may be different according to the position of the passenger in the inner space of the vehicle.

BRIEF DESCRIPTION OF THE DRAWINGS

FIG. 2 is a perspective view of a vehicle in which a door is opened in the vehicle according to the embodiment of the present disclosure.

FIG. 11 is a view illustrating a state in which the first and second displays of FIG. 10 are moved to a second zone.

MODE FOR INVENTION

Figure 1:
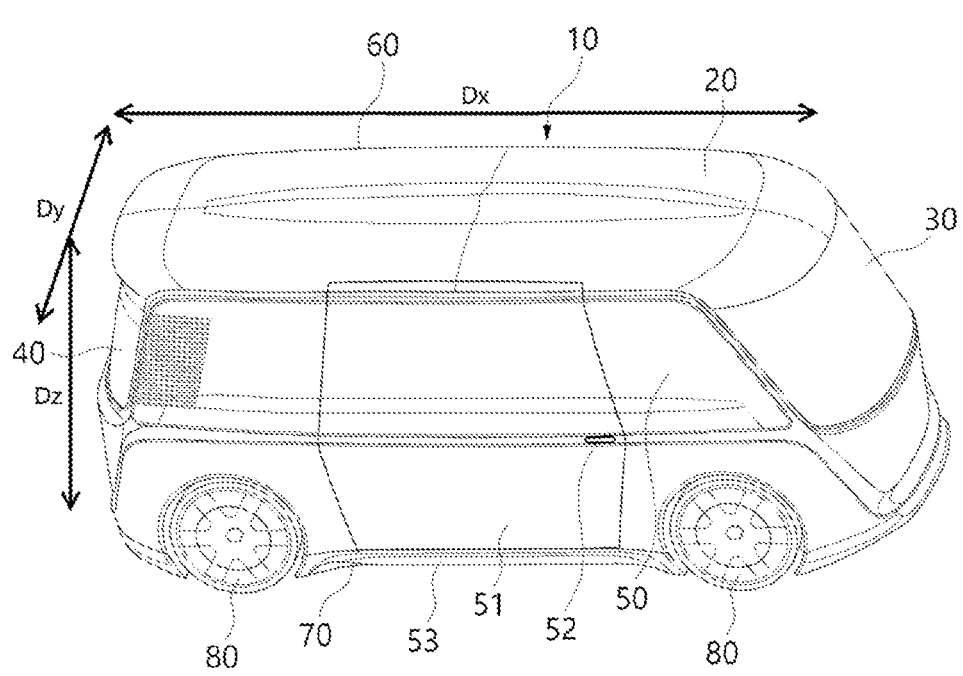
FIG. 1 is an external perspective view of a vehicle according to an embodiment of the present disclosure.

Hereinafter, some embodiments of the present disclosure will be described in detail with reference to the illustrative drawings. In the addition of reference numerals to the components of each drawing, it should be noted that the same components have the same numerals as possible even if they are displayed on different drawings. Further, in the following description of embodiments of the present disclosure, a detailed description of well-known configurations or functions will be omitted when it is deemed that such description will interfere with the understanding of the embodiments of the present disclosure.

The present disclosure relates to a display device, a vehicle having the display device, and a method of controlling the vehicle. The display device may be arranged in an inner space of the vehicle and may include a plurality of displays. The plurality of displays may display content independently or may display one content in connection with and extending each other.

The display device of the present disclosure may be provided in various types of vehicles. For example, it may be provided in an autonomous vehicle. The number and position of the plurality of displays may be changed according to the type of the vehicle and the shape of the inner space.

In addition, the present disclosure provides a method for controlling an operation of a vehicle by arranging devices and items capable of providing various services in the inner space of the vehicle and detecting a behavior or status of a passenger. The vehicle of the present disclosure may be applied to any vehicle capable of providing an inner space and arranging the devices and the items.

Hereinafter, a display device, a vehicle having the display device, according to an embodiment of the present disclosure will be described in detail with reference to the accompanying drawings.

The display device of the present disclosure may be installed in a vehicle 10. The vehicle 10 may be an inner combustion engine vehicle having an engine, a hybrid vehicle having an engine and an electric motor, an electric vehicle having an electric motor, a hydrogen fuel cell vehicle having a fuel cell, and the like. In addition, the vehicle 10 may be an autonomous vehicle that may be operated by itself without a user's manipulation.

A plurality of wheels 80 may be installed in the vehicle 10, and a casing may constitute an overall exterior. The casing may include an upper casing 20, a front casing 30, a rear casing 40, a right side casing 50, a left side casing 60, and a lower casing 70. Some of these casings 20 to 70 may be made of glass or a transparent material such that the outside may be seen from the inside.

An inner space (S) may be formed in the vehicle 10 by the casings 20 to 70. An opening 23 for opening the inner space (S) may be formed in one of the right side casing 50 or the left side casing 60. In an embodiment, the opening 23 is formed in the right side casing 40. A door 51 for opening and closing the opening 23 may be installed in the opening 23. An installation position of the opening 23 and the door 51 may be determined according to a direction in which the vehicle travels on the road. For example, the opening 23 and the door 51 may be installed in the right side casing 50 when the vehicle passes on the right side, and may be installed in the left side casing 60 when the vehicle passes on the left side. A passenger (P) may open the door 51 to enter or exit the inner space (S) through the opening 23.

Figure 2:
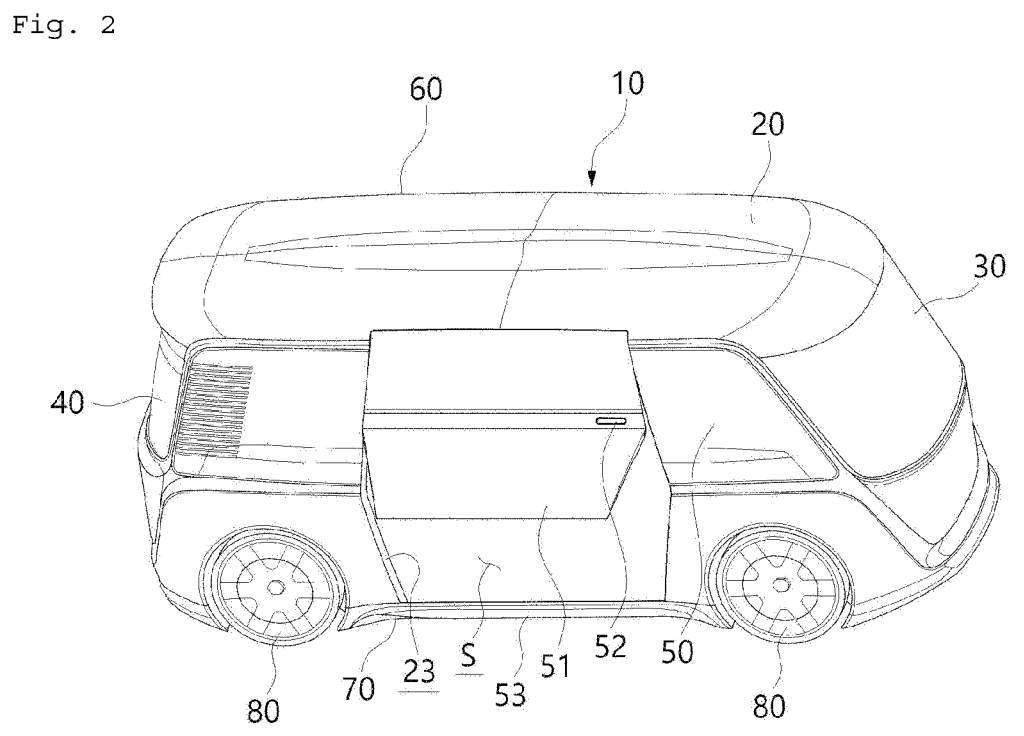
Figure 3:
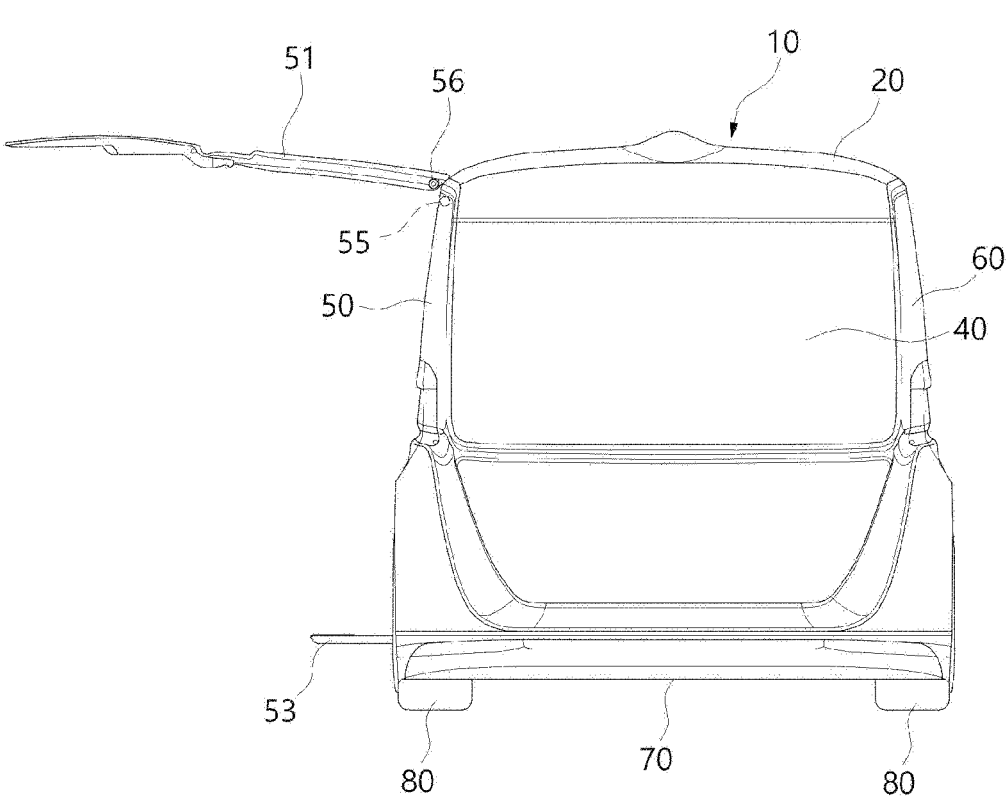
FIG. 3 is a front view illustrating a door is opened in the vehicle according to the embodiment of the present disclosure.

A handle 52 may be installed an the outer surface of the door 51. A passenger may pull the handle 52 to open the door 51. As shown in FIG. 2, in the present embodiment, the door 51 is lifted up and opened. In another embodiment, it may be pushed in a left direction or a right direction to be opened. The right side casing 50 may be provided with a footrest 53 below the door 51 to allow the passenger (P) to step on and off. When the door 51 is closed, the footrest 53 may be hidden inside the vehicle 10 and may protrude to the outside when the door 51 is opened. For example, FIG. 3 illustrates a state in which the footrest 53 protrudes. In another embodiment, the door 51 may be automatically opened and closed using a portable remote controller (not shown).

A door opening/closing sensor 55 for detecting whether the door 51 is opened or closed may be installed at one side of the right side casing 50. The door opening/closing sensor 55 may be, for example, a hall sensor. A sensing magnet 56 may be installed on a side surface of the door 51 at a position corresponding to the door opening/closing sensor 55 in a state in which the door 51 is closed. When the door 51 is closed, the hall sensor may sense the sensing magnet 56, and when the door 51 is opened, the hall sensor may not detect the sensing magnet 56. A door opening/closing detection signal of the door opening/closing sensor 55 may be transmitted to a processor 900 to be described below. The processor 900 may determine whether the door 51 is opened or closed according to a door opening/closing detection signal. The installation position of the hall sensor and the sensing magnet may be changed as well.

Figure 4:
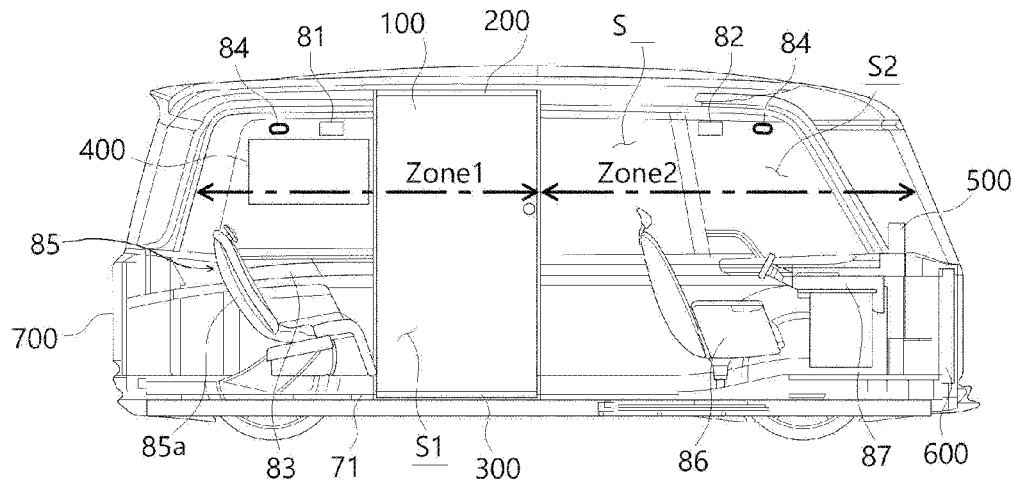
FIG. 4 is a side view illustrating the inside of the vehicle from which the right side casing is removed in the vehicle according to the embodiment of the present disclosure.
Figure 5:
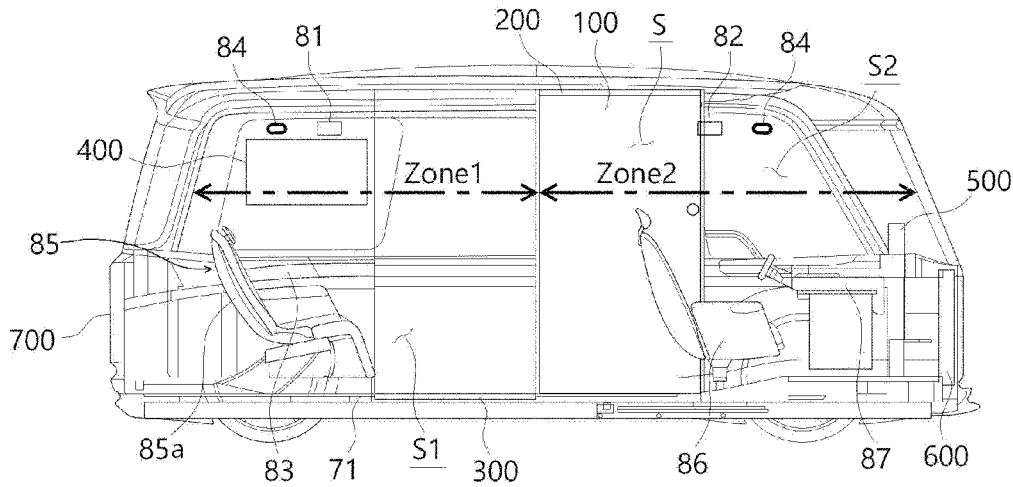
FIG. 5 is a view illustrating a state in which some displays installed inside the vehicle are moved according to the embodiment of the present disclosure.

As shown in FIGS. 4 and 5, the inner space (S) may be divided into a plurality of zones in the front-rear direction of the vehicle 10. In the present embodiment, the inner space (S) is divided into two zones. Of course, in another embodiment, the inner space (S) may be divided into three or more zones. In the drawings, when the right direction is viewed toward the front of the vehicle 10, the first zone (Zone 1) of the two zones may be formed on the rear side in the front-rear direction of the vehicle 10, and the second zone (Zone 2) may be formed on the front side.

The first zone and the second zone may be concepts of the first inner space (S1) and the second inner space (S2) divided for each zone in the inner space (S), and may be a concept of an area formed in each of the inner spaces (S1, S2). The first zone and the second zone may be spaces for different purposes, and may have an environment and design suitable for each purpose. For example, the first zone may be a space for rest and entertainment, and the second zone may be a space for an office. The first zone may be relatively larger than the second zone. The first zone may provide a space for a passenger to relax, play games or exercise.

Figure 12:
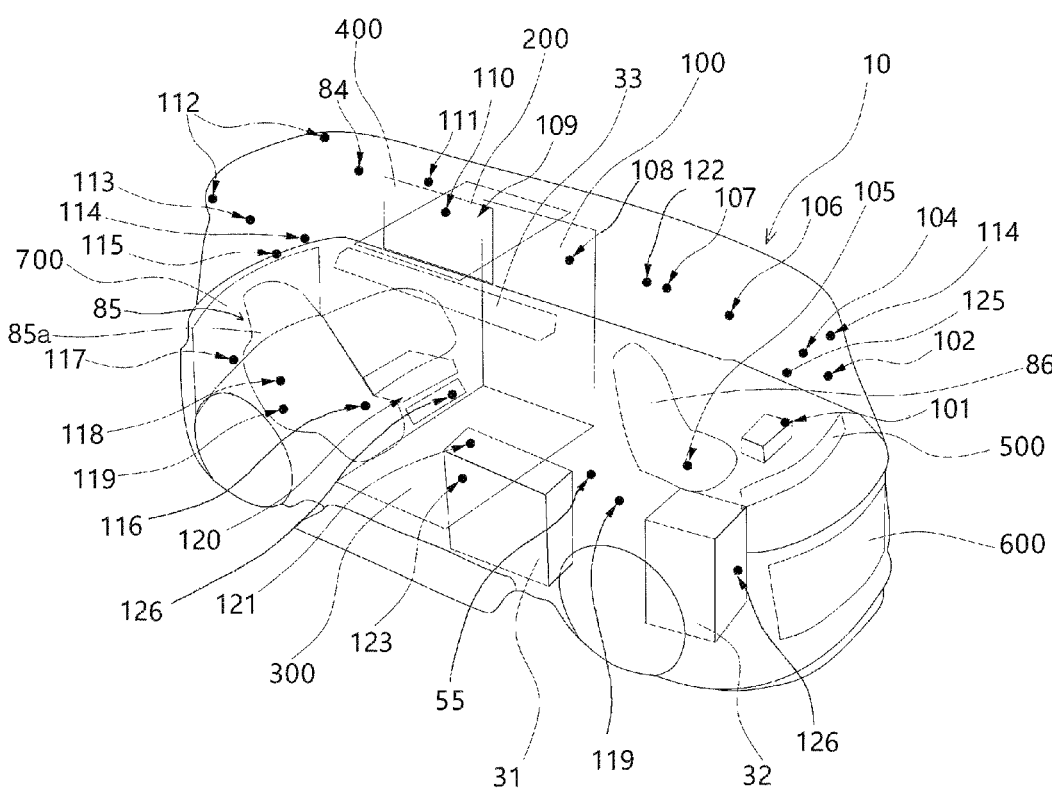
FIG. 12 is a view schematically illustrating positions of a plurality of sensors, cameras, electronic devices, and products installed in the vehicle according to the embodiment of the present disclosure.

Various items suitable for the purpose and environment of each space may be disposed in the first zone and the second zone. For example, a rest chair 85 and a couch 83 may be disposed in the first zone. In addition, as shown in FIG. 12, a small home appliance for a vehicle such as a refrigerator 31, a coffee machine 32, an air shower 33, a shoe styler 120, a clothing styler, an oven, and a microwave oven (not shown), a game machine for entertainment, an exercise equipment, and the like may be installed. In the second zone, a driver seat 86', an office desk 87, an office chair 86, and the like may be disposed in the second zone.

A plurality of displays may be arranged in the inner space (S). Among the plurality of displays, a first display 100 may be arranged on a side portion of the inner space (S) in a first direction, and a second display 200 may be installed on an upper portion of the inner space (S) in a second direction. The angle formed by the first direction and the second direction may be 80 to 110 degrees, preferably perpendicular to each other.

The first zone may be a set initial position of the first and second displays 100 and 200. The first and second displays 100 and 200 may be moved from the first zone to the second zone and vice versa. The first and second displays 100 and 200 may be moved between the first zone and the second zone by a driving part 850 to be described below.

Figure 6:
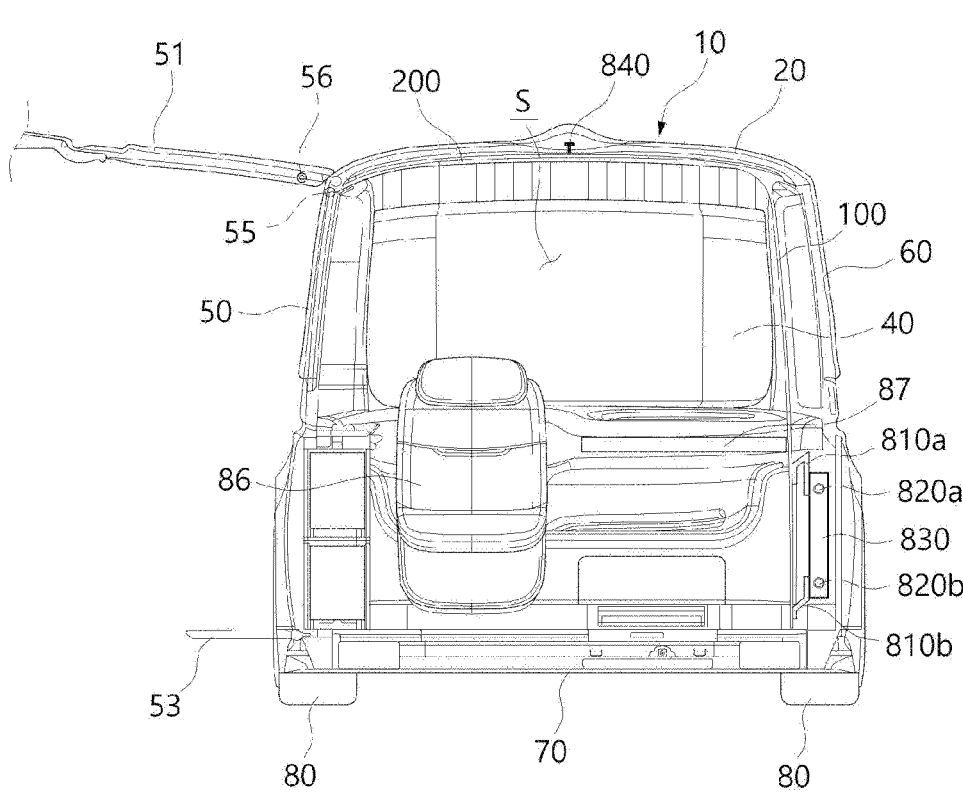
FIG. 6 is a front view illustrating the inside of the vehicle from which the front casing is removed in the vehicle according to the embodiment of the present disclosure.

As shown in FIG. 6, in the present embodiment, the first display 100 may be vertically installed on the left side casing 60 in the inner space (S) so that the screen may face the right side casing 50. Of course, depending on the installation location of the door 51, it may be installed in the opposite way. That is, when the door 51 is installed in the left side casing 60, the first display 100 may be vertically installed on the right side casing 50 in the inner space (S) so that the screen may face the left side casing 60. The second display 200 may be installed in the horizontal direction at the upper casing 20 in the inner space (S) to face the lower casing 70. In this case, the first and second displays 100 and 200 may be integrally installed. That is, the upper portion of the first display 100 and one side portion of the second display 200 are integrally connected. Alternatively, the separated first and second displays 100 and 200 may be coupled to each other by a coupling means (not shown).

A driving part 850 may be installed on the rear surface of the first display 100 to move the first and second displays 100 and 200 between the first zone and the second zone. The driving part 850 may also be fixedly installed on an inner surface of the left side casing 60. The driving part 850 may be driven according to a control signal transmitted from a processor 900 to move the first and second displays 100 and 200 in the front-rear direction of the vehicle 10. In this case, a slide rail 840 may be installed on an inner surface of the upper casing 20 for smooth movement of the first and second displays 100 and 200. A rear surface of the second display 200 coupled to the first display 100 or integrally installed may be connected to the slide rail 840. The slide rail 840 may extend from the first zone to the second zone.

At least one roller (not shown) may be formed on the rear surface of the second display 200. As the roller is coupled to the slide rail 840 and rotates along the slide rail 840, the first and second displays 100 and 200 may smoothly move between the first zone and the second zone.

The driving part 850 may include an upper frame 810a and a lower frame 810b. One sides of the upper frame 810a and the lower frame 810b may be fixedly installed on the lower surface of the first display 100. The other sides of the upper frame 810a and the lower frame 810b may be fixedly installed on one surface of a ball nut 830 having a predetermined length in the vertical direction (Dz). Two holes may be provided in the ball nut 830, and a screw thread may be formed on the inner surface of the hole. An upper ball screw 820a and a lower ball screw 820b may be inserted into the holes, respectively. The upper and lower ball screws 820a and 820b may be fixedly installed on the inner surface of the left side casing 60. Although not shown in the drawings, the upper and lower ball screws 820a and 820b may be firmly fixed to the left side casing 60 to move between the first and second zones while stably supporting the first and second displays 100 and 200 through the ball nut 830 and the upper and lower frames 810a and 810b.

Screw Threads may be formed on the outer circumferential surfaces of the upper and lower ball screws 820a and 820b to correspond to the screw thread of each hole. The screw threads formed on the outer circumferential surfaces of the upper and lower ball screws 820a and 820b and the screw threads formed on the inner surface of each hole may be formed so that the grooves and pitches are engaged.

Figure 7:
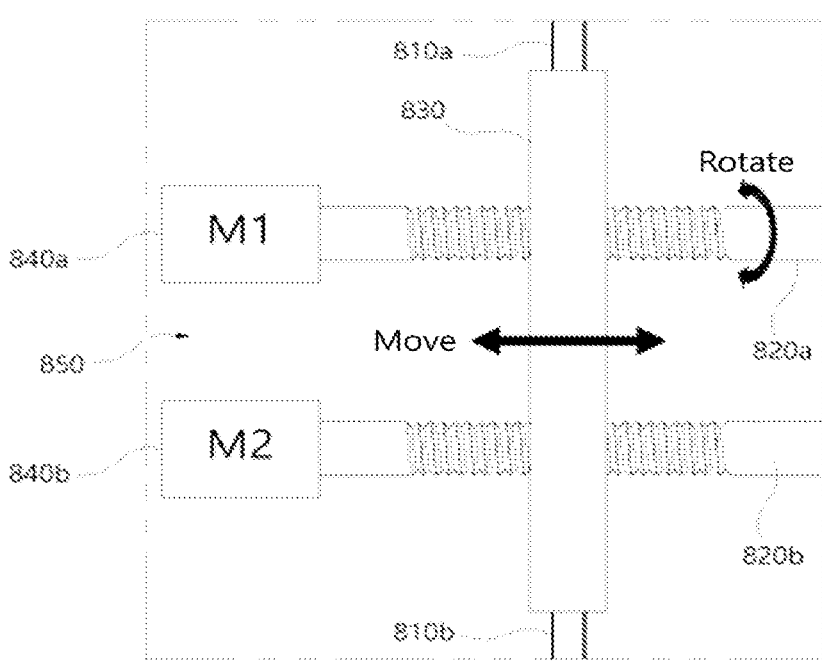
FIG. 7 is a configuration diagram of a driving part for moving a display according to the embodiment of the present disclosure.

FIG. 7 illustrates a state in which the driving part 850 is operated. Motors 840a and 840b may be connected to the ball screws 820a and 820b. The motors 840a and 840b may be driven according to a control signal of the processor 900. When the motors 840a and 840b rotate, the ball screws 820a and 820b may rotate. Depending on the interaction between the ball screws 820a and 820b and the ball nut 830, the ball nut 830 moves forward and backward of the vehicle 10. As the first display 100 is fixedly installed on the ball nut 830, the first and second displays 100 and 200 are also moved together with the ball nut 830.

Referring back to FIG. 4, a first sensing part 81 and a second sensing part 82 for detecting a passenger may be installed in the inner space (S) of the vehicle 10. The first sensing part 81 may detect a passenger in the first zone and the second sensing part 82 may detect a passenger in the second zone. The first and second sensing parts 81 and 82 may be installed in an inner portion of the upper casing 20 of the vehicle 10 in the first zone and the second zone, respectively. The first and second sensing parts 81 and 82 may be, for example, at least one of a face recognition sensor, a fingerprint recognition sensor, an iris recognition sensor, an image recognition sensor, an NFC sensor, and an infrared sensor. As another example, the first and second sensing parts 81 and 82 may be CCTV cameras. The first and second sensing parts 81 and 82 may transmit a passenger detection signal to the processor 900.

At least one voice recognition part 84 may be further installed in the inner space (S). The voice recognition part 84 may recognize a voice of the passenger. The voice recognition signal recognized by the voice recognition part 84 may be transmitted to the processor 900.

Figure 8:
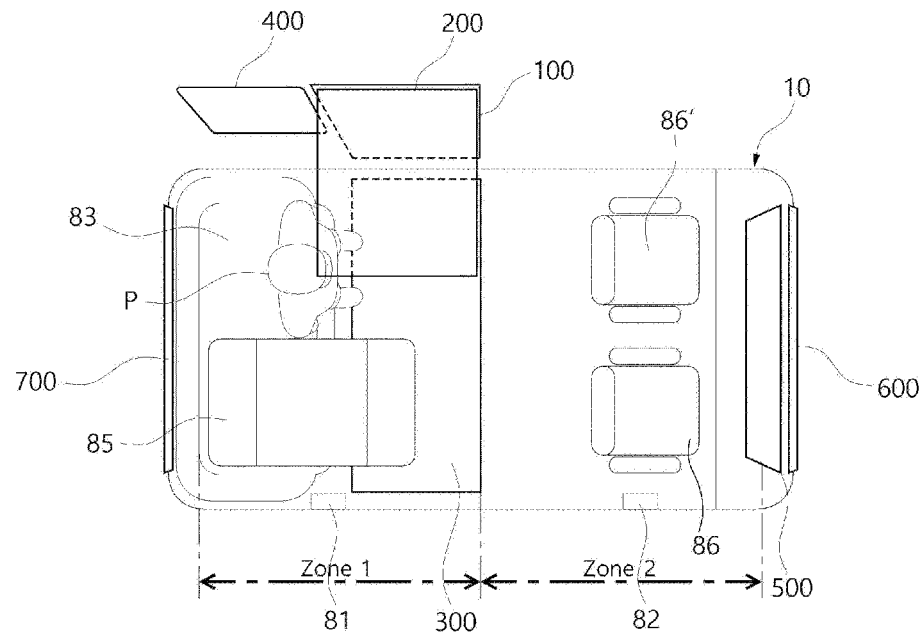
FIG. 8 is a plan view schematically illustrating the inside of the vehicle from which a top casing is removed in the vehicle according to the embodiment of the present disclosure.
Figure 9:
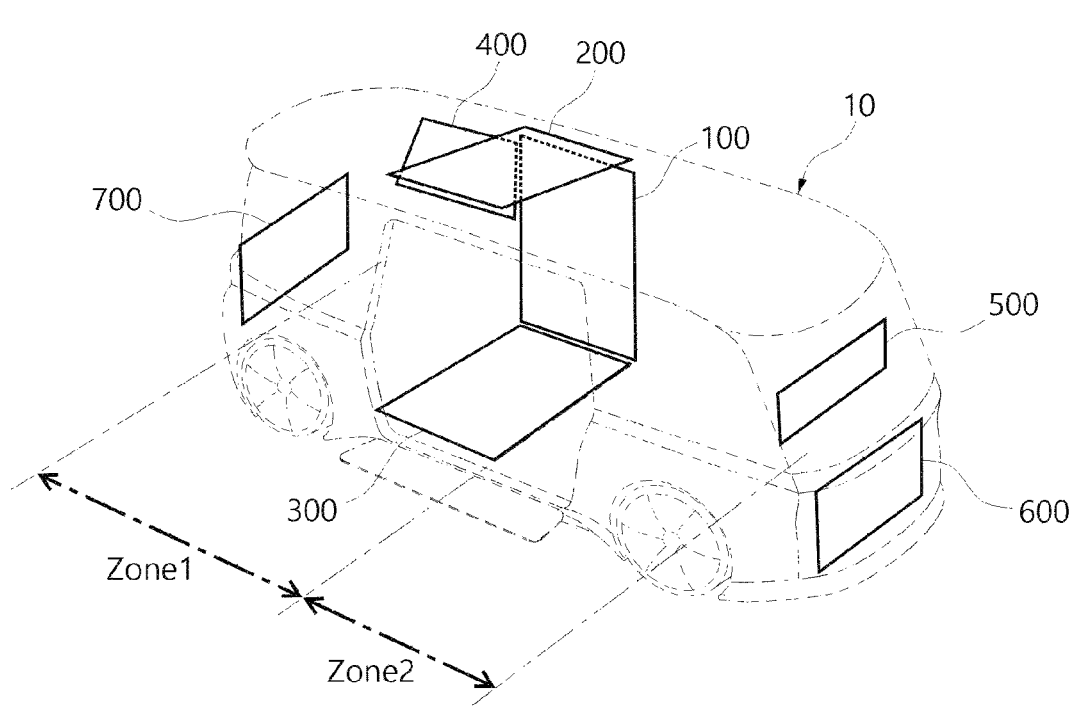
FIG. 9 is a schematic layout view of a plurality of displays according to the exemplary embodiment of the present disclosure.

FIGS. 8 and 9 illustrate an example in which the plurality of displays 100 to 700 are disposed in the inner space (S) of the vehicle 10. In the initial state, the first and second displays 100 and 200 may be disposed in the first zone (Zone 1), which is the set initial position. The first display 100 may be installed on one side portion of the inner space (S) in the vertical direction such that the screen faces the first direction, and the second display 200 may be installed in the horizontal direction such that the screen faces the second direction on the upper portion of the inner space (S). A manipulation part 101 capable of setting and changing an image displayed on the first display 100 may be selectively further installed on the first display 100. The manipulation part 101 may be, for example, a dial device (see FIGS. 10 and 11).

At least one of the third display 300 and the fourth display 400 may be further disposed in the first zone. The third display 300 may be disposed at a lower portion of the inner space (S) in a third direction opposite to the second direction. In this case, the third display 300 may be disposed to correspond to the initial position of the first display 100. Accordingly, when the first display 100 is in the first zone, the second display 200 is disposed in the upper portion of the first zone and the third display 300 is disposed in the lower portion of the first zone with respect to the first display 100. In addition, when the first and second displays 100 and 200 are in the first zone, the third display 300 may be disposed such that one side portion thereof is adjacent to the lower portion of the first display 100.

The fourth display 400 may be disposed at a side portion of the inner space (S) in the first direction to be spaced apart from the first display 100 by a set distance. The fourth display 400 may be disposed to correspond to a position at which the couch 83 is provided to allow the passenger to comfortably touch the fourth display 400. The surface of the third display 300 may be specially coated to make it safe and durable enough for passengers to step on.

When the first and second displays 100 and 200 are in the first zone, the third and fourth displays 300 and 400 may display images to allow the passenger to enjoy the rest and entertainment.

A fifth display 500 may be further disposed in the second zone. The fifth display 500 may be disposed in the second zone in a fourth direction different from the first, second and third directions. For example, the fourth direction may be perpendicular to the first, second, and third directions. In this embodiment, the fifth display 500 may be disposed such that the screen faces the direction of the rear casing 40 of the vehicle 10 in the office desk 87 in the second zone. The fifth display 500 may be used when a passenger is performing office work. When the first and second displays 100 and 200 move from the first zone to the second zone, the images may be displayed on all of the first, second, and fifth displays 100, 200, and 500.

In addition, a sixth display 600 may be further disposed to face the front of the vehicle 10 in the front casing 30 of the vehicle 10, and a seventh display 700 may be further disposed to face the rear of the vehicle 10 in the rear casing 40 of the vehicle 10.

The sixth display 600 and the seventh display 700 may display driving information, status information, notification information, and the like of the vehicle to external people at the front and rear of the vehicle 10. The external people may check such information to prevent a collision or an emergency situation in real time and to prevent an accident in advance.

Figure 10:
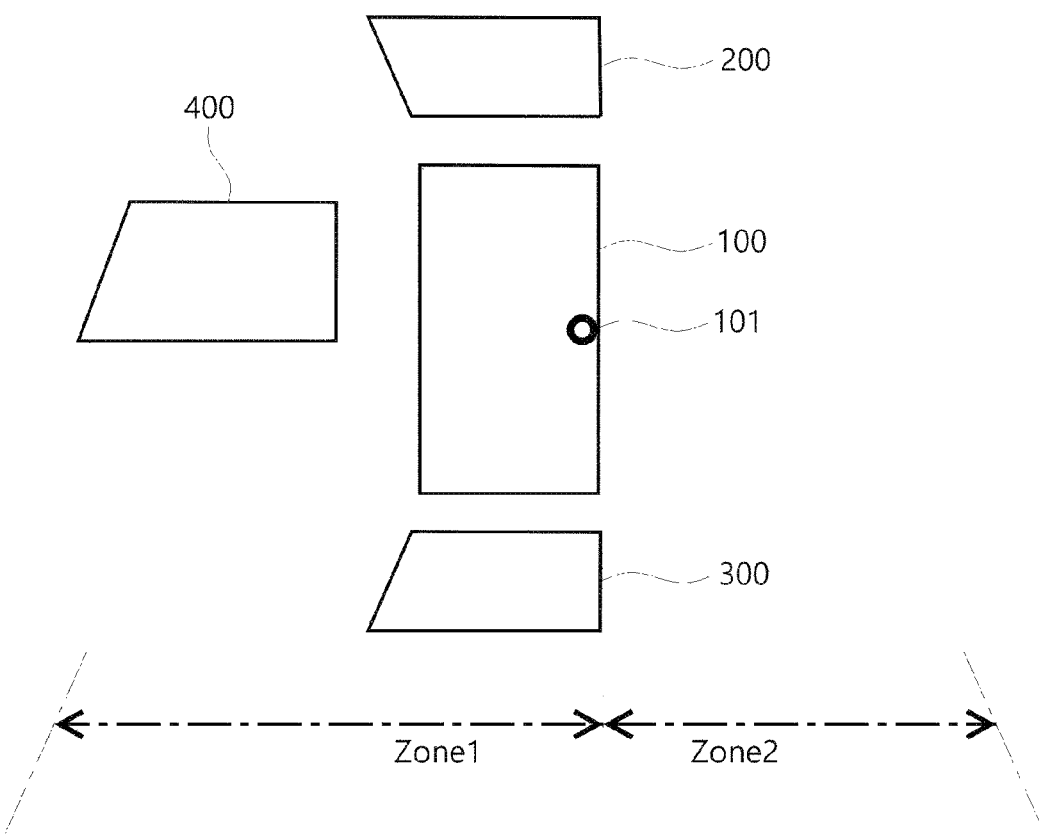
FIG. 10 is a view illustrating a state in which the first and second displays of FIG. 9 are in a first zone.
Figure 11:
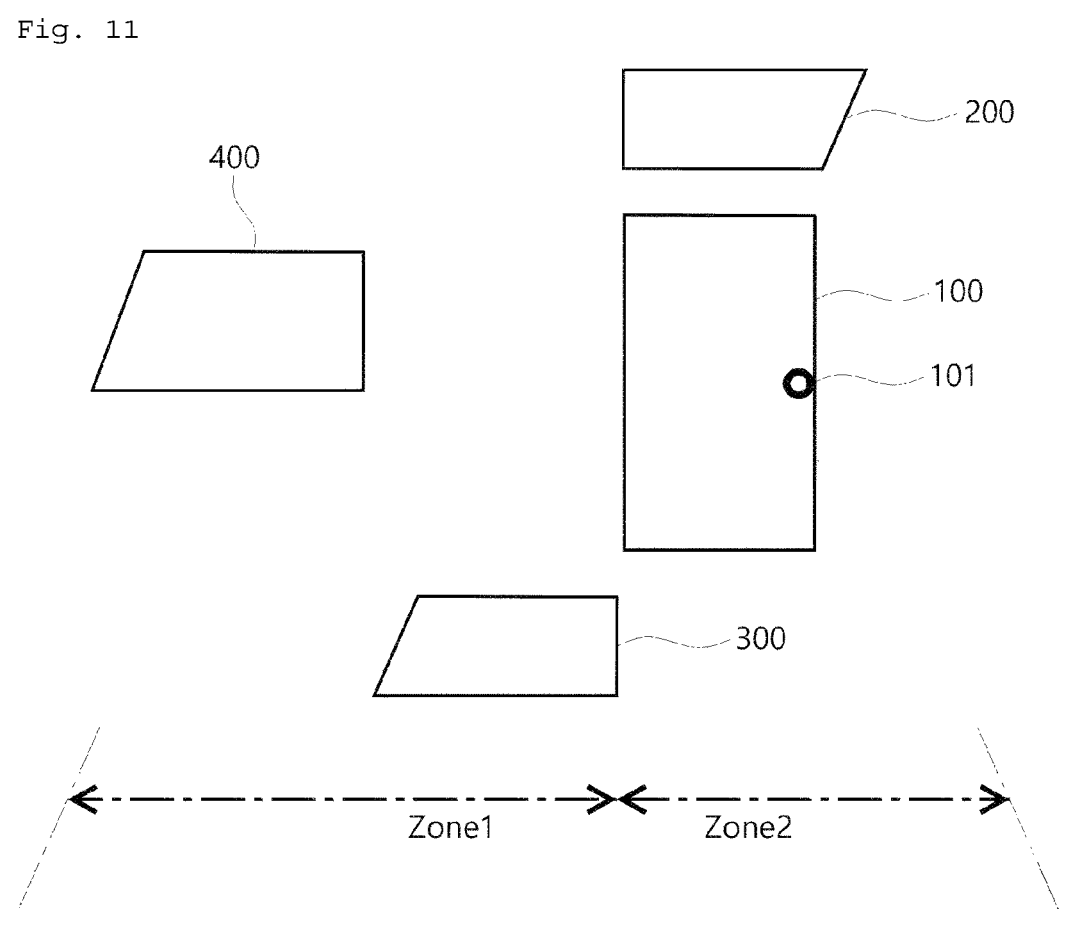

As shown in FIG. 10, in the initial state, the first and second displays 100 and 200 may be in the first zone in which the first and second displays 100 and 200 are in the initial position. As shown in FIG. 11, the first and second displays 100 and 200 may be moved to the second zone. Accordingly, when the first and second displays 100 and 200 are in the first zone, the first and second displays 100 and 200 may be disposed close to the third and fourth displays 300 and 400. When the first and second displays 100 and 200 are in the second zone, the first and second displays 100 and 200 may be disposed close to the fifth display 500. The passenger (P) may be seated on the office chair 86 in the second zone to view the images displayed on the fifth display 500 and/or the first and second displays 100 and 200. In addition, the passenger (P) may be seated on the rest chair 85 or may be seated on or lying on the couch 83 in the first zone to view the images displayed on the first to fourth displays 100 to 400 or the first, second and fifth displays 100, 200, and 500

The first to seventh displays 100 to 700 may display images, respectively, according to screen control signals output from the processor 900. A first image may be displayed on the first display 100. The first image may be a main content desired by the passenger (P). The first image may be, for example, a virtual interactive content that operates according to the preference of the passenger (P). Alternatively, by providing a virtual space in the vehicle 10, the passenger (P) may indirectly have an immersive experience.

In this embodiment, the first display 100 may support rich graphics and multimedia. For example, by using a high-performance GPU to visualize cutting-edge 3D graphics, passengers may enjoy premium entertainment content through a first image displayed on the first display 100.

In addition, the vehicle 10 may display a passenger-customized virtual assistant on the first display 100 and/or another display by applying an advanced AI engine. Furthermore, the vehicle 10 may allow a passenger to enjoy a sense of realism through a natural voice control and a human-machine interface (HMI). In addition, a premium audio environment including a passenger-customized multi-area audio, a clear vehicle communication, a noise, and an echo cancellation function may be provided.

A second image may be displayed on the second display 200. The second image may be subsequent to the first image. That is, the second image subsequent to the first image displayed on the first display 100 may be extended and displayed on the second display 200. Here, the 'extended' and 'subsequent' mean that the second image is displayed as a part of the first image. For example, when the first display may display tents, chairs, equipment, and the like at a campsite, the second display extends the campsite and the surrounding environment of the campsite. In this case, the second display is located above the first display, so for example, if the first image is the camping site, the sky and clouds of the camping site may be displayed on the second display as the upper part of the camping site. In this way, the second image of sky and clouds is a part of the first image and may be a further extension of the first image. Therefore, the second image may be an 'extended' or 'subsequent' to the first image. Meanwhile, in another embodiment, a separate, independent second image that is not subsequent to the first image may be displayed on the second display 200 at the request of the passenger. In other words, a second image independent of the first image may be displayed.

The third display 300 may display a third image. The third image may be an image subsequent to the first image or a separate image independent of the first image. For example, the third display 300 may display a lawn (third image) subsequent to the virtual space (first image) of the campsite displayed on the first display 100.

As another example, when a virtual assistant is displayed on the first display 100 as a first image, the second and third displays 200 and 300 may extend and display an environment in which the virtual assistant is present.

As described above, in the vehicle 10 of the present disclosure, the second and third displays 200 and 300 display the second and third images subsequent to the first image of the first display 100, respectively, so that the passenger may enjoy entertainment content through the plurality of display. Furthermore, by providing the inner environment suited to specific purposes, it is possible to provide infrastructure that ensures comfort and practicality for passengers. A fourth image may be displayed on the fourth display 400.

The fourth image may be an image subsequent to the first image or a separate image independent of the first image. In addition, an image for manipulating the image of the first, second, and third displays 100, 200, and 300 may be displayed on the fourth display 400. For example, when a plurality of buttons may be displayed on the fourth display 400 and at least one of the plurality of buttons is touched, the processor 900 may receive the touch signal and manipulate one of the first, second, and third images displayed on the first, second, and third displays 100, 200, and 300. The fourth display may display, for example, a menu, item, content, and the like for manipulating the first, second, and third images.

A fifth image may be displayed on the fifth display 500. The fifth image may be an imagen subsequent to the first image or a separate image independent of the first image. The fifth display 500 in the second zone may displays an image related to office work. The fifth display 500 may display the fifth image regardless of the positions of the first and second displays 100 and 200. When the first and second displays 100 and 200 are in the second zone, the fifth image may be an image that is subsequent to the first image.

Alternatively, in another embodiment, the first and second images may be a subsequent image of the fifth image. That is, the fifth image may become the main content and the first and second images may be subsequent to the main content. For example, a virtual space of a camping site may be displayed on the fifth display 500 as the fifth image, the first display 100 may display trees and the like in the left surrounding environment of the virtual space of the camping site as the first image, and the sky and the cloud of the upper portion of the virtual space of the camping site may be displayed on the second display 200 as the second image. This may be applied to a case in which an office image is displayed. For example, when a specific document is displayed on the fifth display 500, the specific document may be further extended and displayed on the first and second displays 100 and 200.

A sixth image and a seventh image may be displayed on the sixth display 600 and the seventh display 700, respectively. The sixth and seventh images are displayed on the outside of the vehicle 10, and a person outside the vehicle 10 may visually check information of the vehicle 10.

The unexplained reference numeral 112 is an Ultra Wide Band (UWB) anchor used to measure the position of a passenger in the inner space.

Figure 13:
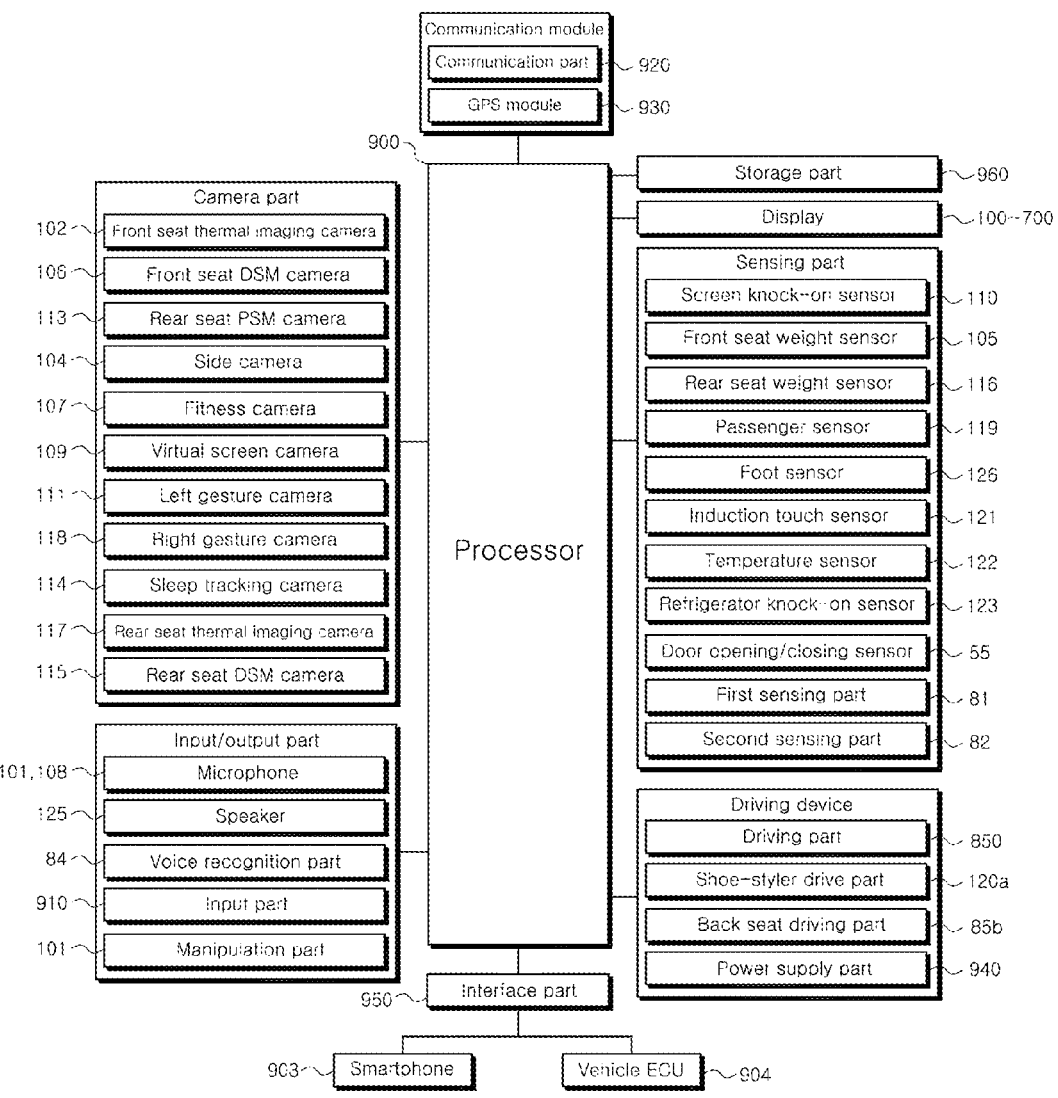
FIG. 13 is a block diagram illustrating a connection relationship between the display devices and a processor for describing a control flow according to an operation of the vehicle according to the embodiment of the present disclosure.

As shown in FIGS. 12 and 13, the vehicle 10 of the present disclosure may include a camera part, an input/output part, a sensing part, a driving device, a storage part, a display, a communication module, and the like as well as a small electronic device for a vehicle. The sensing part and the camera part may sense not only the position of a passenger (P) but also a behavior and a status of the passenger (P). In addition, the vehicle 10 may include the processor 900, and the processor 900 may be connected to the other components.

Microphones 101 and 108 and a speaker 125 may be installed in the vehicle 10, respectively. The microphones 101 and 108 and the speaker 125 may be installed at a plurality of positions in the first zone and the second zone. The microphones 101 and 108 may recognize the voice of the passenger, and the speaker 125 may output a guidance message, a warning message, songs and music, and the like relating the vehicle 10 and the passenger (P).

The vehicle 10 may be provided with a front seat weight sensor 105 and a rear seat weight sensor 116, respectively. The front seat weight sensor 105 may be installed on the seat of the office chair 86 in the second zone to sense whether the passenger sits on the chair 86. The rear seat weight sensor 116 may be installed in the rest chair 85 or the couch 83 in the first zone to sense whether the passenger sits on the rest chair 85 or the couch 83.

A passenger sensor 119 for detecting a passenger may be installed in the vehicle 10. The passenger sensor 119 may be installed in each of the first zone and the second zone to detect whether there is a passenger in the first zone and whether there is a passenger in the second zone. The passenger sensor 119 may be a first sensing part 81 and a second sensing part 82. The position of the passenger may be an important factor when controlling an operation of the vehicle 10. This is because, when the vehicle 10 is controlled according to the behavior and status of the passenger, the control process may vary depending on whether the position of the passenger is the first zone or the second zone. In addition, the passenger sensor 119 may sense not only the presence of a passenger in the first and second zones, but also whether the passenger boards the vehicle 10. In addition, the passenger sensor 119 may recognize and identify the face of the passenger and may track the passenger as the passenger moves. Accordingly, when a plurality of passenger sensors 119 are installed, a portion of each detected area may be overlap each other. In this embodiment, the passenger sensor 119 may be, for example, at least one of a face recognition sensor, a fingerprint recognition sensor, an iris recognition sensor, an image recognition sensor, an NFC sensor, and an infrared sensor.

A plurality of foot sensors 126 may be installed in the vehicle 10. The foot sensors 126 may be installed in each of the first zone and the second zone to sense whether the passenger has taken off the shoes. The foot sensors 126 may be installed in a shoe styler 120 to be described below in the first zone, and may be installed under the office chair 86 in the second zone. The foot sensors 126 may include, for example, an image recognition sensor, an infrared sensor, or the like.

A screen knock-on sensor 110 and a refrigerator knock-on sensor 123 may be installed in the vehicle 10, respectively. The screen knock-on sensor 110 may be installed in one or more of the first to fourth displays 100 to 400. When the passenger knocks on the display, the screen knock-on sensor 110 may sense a unique sound wave or vibration generated by the knock. The processor 900 may turn on the display in response to the sound wave or the vibration sensing signal transmitted from the screen knock-on sensor 110. The turning off of the display may also be applied in the same way. Accordingly, the passenger may turn on/off the display with only a knock without using an on/off switch (or button) of the display. The refrigerator knock-on sensor 123 may be installed in a refrigerator 31. In the present embodiment, the refrigerator 31 may be a see-through refrigerator with a transparent window through which the inside of the refrigerator may be seen, and thus, when the passenger knocks on the refrigerator 31, a lighting (not shown) installed inside the refrigerator 31 may be turned on. As a result, the passenger may see the inside of the refrigerator only with the knock. The screen knock-on sensor 110 and the refrigerator knock-on sensor 123 may be, for example, a sound wave sensor or a vibration sensor.

In another embodiment, the vehicle 10 may include an induction. An induction touch sensor 121 having an inductor may be provided. The induction touch sensor 121 may be a sensor for operating the induction.

The vehicle 10 may include a temperature sensor 122. The temperature sensor 122 may measure the temperature of the inner space. The temperature sensor 122 may set the temperature of the inner space to a desired temperature by the user. The temperature sensor 122 may be installed at a plurality of positions.

A front seat thermal imaging camera 102 and a rear seat thermal imaging camera 117 may be installed in the vehicle 10, respectively. The front seat thermal imaging camera 102 may capture a thermal image of the area of the second zone, and the rear seat thermal imaging camera 117 may capture a thermal image of the area of the first zone. The thermal imaging cameras 102 and 117 may capture an object including a passenger even when the inner space of the vehicle 10 is dark. In particular, the body temperature of the passenger may be captured.

The vehicle 10 may include a front seat DSM (Driver Status Monitoring) camera 106, a rear 1 seat DSM (Driver Status Monitoring) camera 115, and a rear seat PSM (Passenger Status Monitoring) camera 113. The front seat DSM camera 106 and the rear seat DSM camera 115 may be installed to capture images of the passenger seated on the office chair 86, which serves as a driver's seat when the passenger driving. The vehicle 10 of the present embodiment may travel forward or rearward. When driving forward, the front seat DSM camera 106 may photograph the passenger (driver), and when driving rearward, the rear DSM camera 115 may photograph the passenger (driver). The rear seat PSM camera 113 may be installed to photograph a passenger in the first zone. Images captured by the front seat DSM camera 106, the rear seat DSM camera, and the rear seat PSM camera 113 may be transmitted to the processor 900. The processor 900 may analyze a behavior, a facial expression, a status, and the like of the passenger through an image analysis method using the received image.

A side camera 104 may be installed in the vehicle 10. The side camera 104 is for photographing an external environment and a surrounding environment of the vehicle 10, and a plurality of side cameras 104 may be installed at an appropriate position around an outer casing constituting the vehicle 10 to photograph external and surrounding environments.

A fitness camera 107 may be installed in the vehicle 10. The fitness camera 107 may detect fitness movements of the passenger in the inner space. If it is determined whether the passenger is performing fitness in the inner space, for example, images related to fitness may be displayed on the first, second, and third displays.

A virtual screen camera 109 may be installed in the vehicle 10. For example, the virtual screen camera 109 may be installed on the front surface of the second display 200. When the passenger drives the virtual screen camera 109, the passenger in the first zone and the environment around the passenger may be photographed.

A left gesture camera 111 and a right gesture camera 118 may be installed in the vehicle 10. The left gesture camera 111 may be installed at a portion on the left side of the inner space, and the right gesture camera 118 may be installed at a portion on the right side of the inner space. The left/right gesture cameras 111 and 118 may capture a gesture of the passenger. The gesture image may be transmitted to the processor 900. The processor 900 may analyze the gesture of the passenger to check the passenger's behavior and the status.

A sleep tracking camera 114 may be installed in the vehicle 10. The sleep tracking camera 114 may be installed in the first zone and the second zone and may detect the drowsiness and sleep state of the passengers. In particular, when the passenger is in driving manually in the second zone, the drowsy driving may result in a very dangerous situation, and thus it is important to previously sense the drowsiness and take action in advance. In the first zone, if the passenger feels drowsy while resting, it is necessary to take an action for sleep. The sleep tracking camera 114 may detect information on blinking of the passenger's eyes. For example, it is possible to detect the time, speed, number of times, and interval of the passenger's eye blinking. In this embodiment, the blinking time is detected. For example, it is possible to detect the time taken to blink once. Using the blinking information, it is possible to check whether the passenger is awake, sleepy, or sleeping.

A shoe-styler driving part 120a and a back seat driving part 85b may be installed in the vehicle 10. The shoe-styler driving part 120a is installed in the shoe-styler 120 and may open and close a door of the shoe-styler 120 according to a door opening/closing signal output from the processor 900. The back seat driving part 85b is installed on the rest chair 85, and may adjust the angle of a back seat 85a of the rest chair 85 according to a driving signal output from the processor 900. In the present embodiment, the shoe styler driving part 120a and the back seat driving part 85b may include a motor, and an opening/closing direction and a degree of the door, and a rotation angle and a rotation direction of the back seat 85a may be determined according to a rotation direction and a rotation amount of the motor.

An input part 910 may receive information from the passenger (P). When information is input through the input part 910, the processor 900 may control operations of the display device and the vehicle 10 to correspond to the input information. The input part 910 may include a mechanical input means and a touch input means. The mechanical input means may be, for example, a dial device 101, a mechanical key, a button, a switch, and the like, and the touch input means is a device that inputs information through the passenger's touch and may include a touch sensor that detects the touch motion. As for the touch input means, for example, the input part 910 and the display may be integrated or implemented as a single module. When the display and the touch sensor form a layered structure to form a torch screen, the display may be implemented as the input part 910. The touch sensor may take the form of, for example, a touch film, a touch sheet, or a touch pad. In this embodiment, the fourth display 400 may be the touch input means.

In addition, the passenger (P) may operate the plurality of displays 100 to 700 through the input part 910. For example, each of the displays 100 to 700 may be turned on/off, and screen display and the displayed images may be set and changed.

A communication part 920 may communicate with an external device using a wireless Internet technology. The wireless Internet technology may be, for example, WLAN (Wireless LAN), Wi-Fi (Wireless-Fidelity), Wi-Fi Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced), and the like.

Of course, the communication part 920 transmits and receives data according to at least one wireless Internet technology in a range including the Internet technology which is not listed above. For example, the communication part 920 may be connected to an external device to receive weather information and road traffic situation information. When the vehicle 10 is an autonomous vehicle, the communication part 920 may communicate with an artificial intelligence (AI) module, an unmanned aerial vehicle (UAV), an augmented reality (AR) module, a virtual reality (VR) module, a robot, a drone, a 5th generation (5G) mobile communication device, and the like.

In addition, the communication part 920 may perform short-range communication. To this end, the communication part 920 may support short-range communication using at least one of Bluetooth™, RFID (Radio Frequency Identification), Infrared Data Association (IrDA), UWB (Ultra WideBand), ZigBee, NFC (Near Field Communication), Wi-Fi (Wireless-Fidelity), Wi-Fi Direct, Wireless USB (Wireless Universal Serial Bus) technologies. In the present embodiment, the communication part 920 may support short-range communication between the vehicle 10 and at least one external device by forming a short-range wireless area network. For example, the communication part 920 may wirelessly exchange data with a mobile terminal (not shown) of the passenger. Accordingly, the communication part 920 may receive weather information and road traffic situation information from the mobile terminal. When the passenger rides in the vehicle 10, the communication part 920 may automatically or manually perform pairing with the mobile terminal of the passenger.

A GPS (Global Positioning System) module 930 is a module for acquiring the position of the vehicle, and may acquire the position of the vehicle 10 by using satellite signal transmitted from GPS satellites.

As described above, the first and second sensing parts 81 and 82 may sense passengers in the first zone and the second zone, respectively, and the voice recognition part 84 may recognize the voice of the passenger. In addition, the first and second sensing parts 81 and 82 may recognize and identify the passenger. For example, the face of the passenger may be recognized and identified. In the present embodiment, the passenger may be identified using an image matching technique. The image matching is a technology for comparing two different images to find out whether there is a matching object of the same type. The way to find an object in an image is to convert meaningful features in the image into appropriate numbers and compare those numbers to determine how similar they are, that is, measure the similarity between two images.

Image matching techniques include image template matching, which searches for a location matching the template image in a reference image, and image feature matching, which extracts numerous features from the image and compares them with feature sets of other images to examine similarity. To this end, the passenger may register the face image in advance in a storage part 960 to be described later.

The storage part 960 may include ROM, RAM, EPROM, flash drive, hard drive, and the like, and may store a program for the operation of the processor 900 and various data for controlling the display device and the overall operation of the vehicle 10.

The storage part 960 stores information of the vehicle 10, information of the passenger (P), and programs, software, and data necessary for controlling the operation of the vehicle 10. Information captured and detected (recognized, sensed) by sensing part, the camera part, and the input/output part described above may be stored in the storage part 960. Although the storage part 960 is installed in the vehicle 10 as an example, in other embodiments, the storage part 960 may be installed externally in the form of a database server connected through the communication part 920 or an interface part 950. Alternatively, some information, data, and programs and software may be stored in the storage part 960, and the remaining information and data may be stored in an external database server.

A power supply part 940 may supply power to some components of the display device and the vehicle 10. The power supply part 940 may supply power to, for example, the displays 100 to 700.

The vehicle 10 may include the communication part 920 and the interface part 950. The communication part 920 may communicate with an external device and the vehicle 10. The interface part 902 may communicate with an external device, for example, a smartphone 903 and/or an electronic control part (ECU) 904 of the vehicle 10. Meanwhile, the processor 900 may directly control the vehicle 10 using information transmitted from the sensing part and the camera part, or may be connected to the ECU 904 through the interface 950 to control the operation of the vehicle 10 in the ECU 904.

The processor 900 may control operations of the display device and some devices constituting the vehicle 10. In the present embodiment, the processor 900 may control operations of the driving part 850 and the plurality of displays 100 to 700. The processor 900 may control the displays 100 to 700 to display each image according to information input through the input part 910 and the communication part 920, and may control to set and change the image. In addition, the processor 900 may drive the driving part 850 according to the sensing signal transmitted from the first and second sensing parts 81 and 82 and information input through the input part 910 and the communication part 920 to move the first and second displays 100 and 200 between the first zone and the second zone.

For example, when the first sensing part 81 senses the passenger in the first zone and the second sensing part 82 does not sense the passenger in the second zone, the process 900 may drive the driving part 850 to move the first and second displays 100, 200 in the second zone to the first zone. If the first and second displays 100 and 200 are already in the first zone, the processor 900 does not drive the driving part 850. Similarly, when the first sensing part 81 does not sense the passenger in the first zone and the second sensing part 82 senses the passenger in the second zone, the processor 900 may drive the driving part 850 to move the first and second displays 100, 200 in the first zone to the second zone. If the first and second displays 100 and 200 are already in the second zone, the processor 900 does not drive the driving part 850. When a request to move the first and second displays 100 and 200 is input through the input part 910 and the communication part 920, the processor 900 may drive the driving part 850 to move the first and second displays 100 and 200 between the first zone and the second zone.

In addition, the processor 900 may display contents on the displays 100 to 700. In this case, a separate image may be displayed for each of the displays 100 to 700 independently, and some images may be extended and subsequent to display a screen. The image display of the displays will be described in detail below.

Meanwhile, other devices of the vehicle 10 may be controlled by an electronic control unit (ECU) of the vehicle 10. The processor 900 may control the display device and the vehicle 10 in association with the ECU through the interface part 950. For example, the processor 900 may receive an open and close signal of the vehicle 10 from the ECU, and may receive a seating signal of the resting chair 85, the couch 83, the office chair 86, and the driver's seat 86' of the passenger (P).

Figures 14, 15:
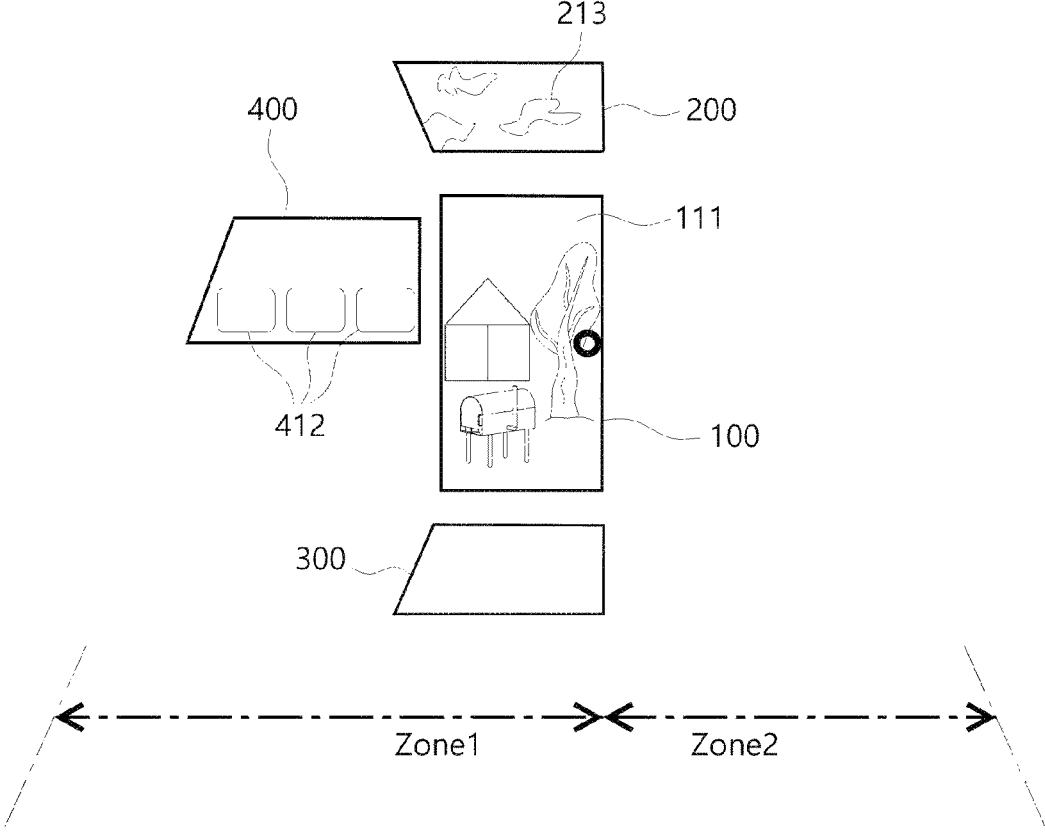
FIG. 14 is a view illustrating an example of information of a passenger in the vehicle according to the embodiment of the present disclosure.
FIG. 15 is an exemplary view of images displayed on displays in the first zone when a first display and a second display are in the first zone according to the embodiment of the present disclosure.

The information of the passenger (P) is previously registered and stored in the storage part 960. FIG. 14 shows an example showing information of two passengers registered in advance. The passenger information may include, for example, the passenger's number and information, registration status, grade, and information of the passenger terminal. When the passenger (P) rides in the vehicle 10, the first and second sensing parts 81 and 82 may recognize and identify the passenger (P) and transmit identification information to the processor 900. Accordingly, the processor 900 may update the current passenger information in real time by comparing the identification information with the passenger information previously stored in the storage part 960. Of course, in another example, some of the passenger's information may be deleted or other information may be added.

Figure 16:
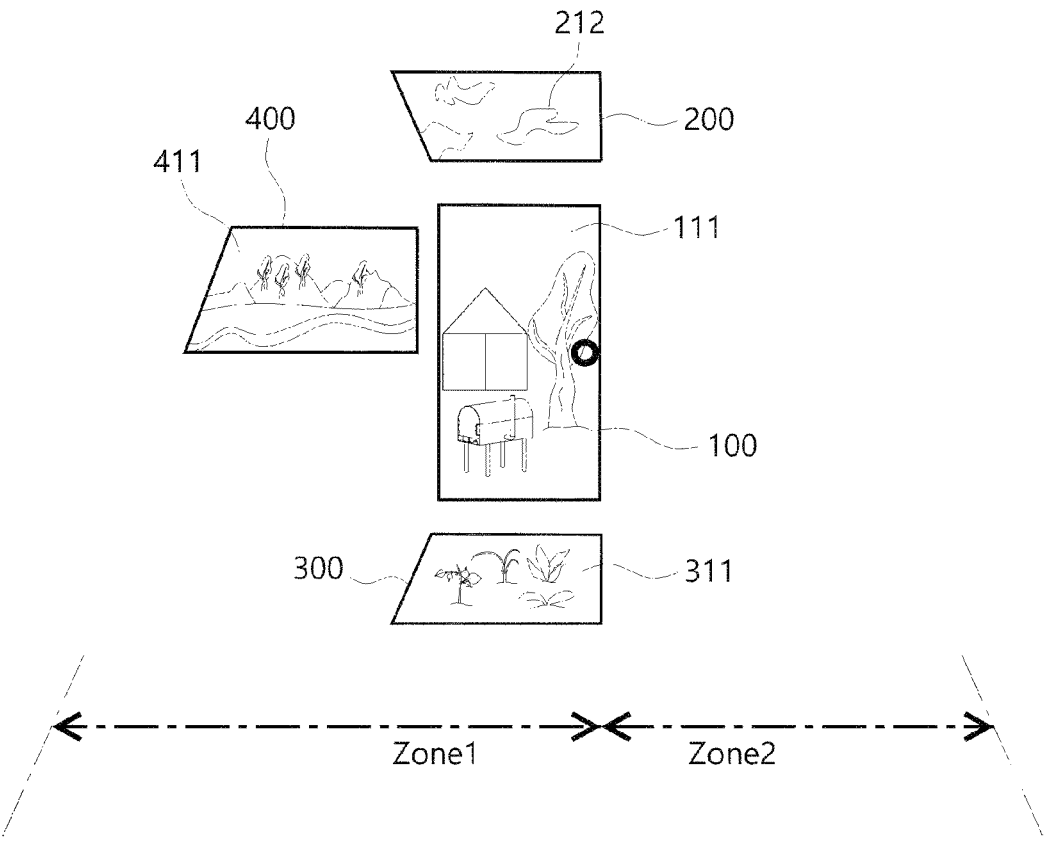
FIG. 16 is another illustrative view of the images displayed on displays in the first zone when the first and second displays are in the first zone according to the embodiment of the present disclosure.

FIGS. 15 and 16 illustrate an example of images displayed on the first to fourth displays 100 to 400. The first to fourth displays 100 to 400 may display images according to a screen control signal output from the processor 900. A first image 111 may be displayed on the first display 100. The first image 111 may be the main content desired by the passenger (P). The first image 111 may be, for example, a virtual assistant or interaction content. Alternatively, a virtual space may be provided in the vehicle 10 so that the passenger (P) may indirectly experience the immersive experience.

A second image 211 may be displayed on the second display 200. The second image 211 may be subsequent to the first image 111. That is, the second image 211 subsequent to the first image 111 displayed on the first display 100 may be extended and displayed on the second display 200. Examples of the first image 111 and the second image 211 are shown in FIGS. 15 and 16. The first image 111 is, for example, a virtual space for a camping site, and camping tents, chairs, equipment, and the like are displayed on the first display 100, and the second image 211 further extends the camping virtual space to display the surrounding environment. For example, the sky and clouds in the virtual space of the camping site as the upper portion of the first image 111 may be displayed as the second image 211. The second image 211 of the sky and the clouds may be extended from the first image 111 of the virtual space of the camping site, and the second image 211 may be an image subsequent to the first image 111. Meanwhile, in another embodiment, a separate, independent second image 211 that is not subsequent to the first image 111 may be displayed on the second display 200 at the request of the passenger. In other words, a second image 211 independent of the first image 111 may be displayed.

The third display 300 may display a third image 311. The third image 311 may also be an image subsequent to the first image 111 or a separate image independent of the first image 111. FIGS. 15 and 16 illustrate an example in which a lawn (third image) that is part of the virtual space of the camping site (first image) displayed on the first display 100 is displayed on the third display 300.

As described above, in the vehicle 10 of the present disclosure, the second and third displays 200 and 300 display the second and third images 211, 311 subsequent to the first image 111 of the first display 100, respectively, so that the passenger may enjoy the entertainment content through multiple displays, and furthermore, an inner environment suitable for a specific purpose may be provided, thereby providing an infrastructure that ensures comfort and practicality to the passenger.

A fourth image 411 may be displayed on the fourth display 400. The fourth image 411 may also be an image subsequent to the first image 111 or a separate image independent of the first image 111. FIG. 15 illustrates an example in which the fourth image 411 independent of the first image 111 is displayed, and FIG. 16 illustrates an example in which the fourth image 411 subsequent to the first image 111 is extended and displayed. FIG. 15 illustrates an example of an image for manipulating the screens of the first, second, and third displays 100, 200, and 300. For example, when a plurality of buttons 412 may be displayed on the fourth display 400 and at least one of the plurality of buttons 412 is touched, the processor 900 may receive the touch signal and manipulate one of the first, second, third images displayed on the first, second, and third displays 100, 200, and 300. The fourth image 411 may be, for example, a menu, an item, content, and the like for manipulating the first, second, third images. FIG. 16 illustrates an example of the fourth image 411 subsequent to the first image 111. When the camping virtual space is displayed as the first image 111, a surrounding environment that extends further to the left of the camping virtual space may be displayed as the fourth image 411. For example, a fourth image 411 such as trees, hills, or a lake may be displayed on the fourth display 400 as a surrounding environment of the camping virtual space displayed as the first image 111.

Figure 17:
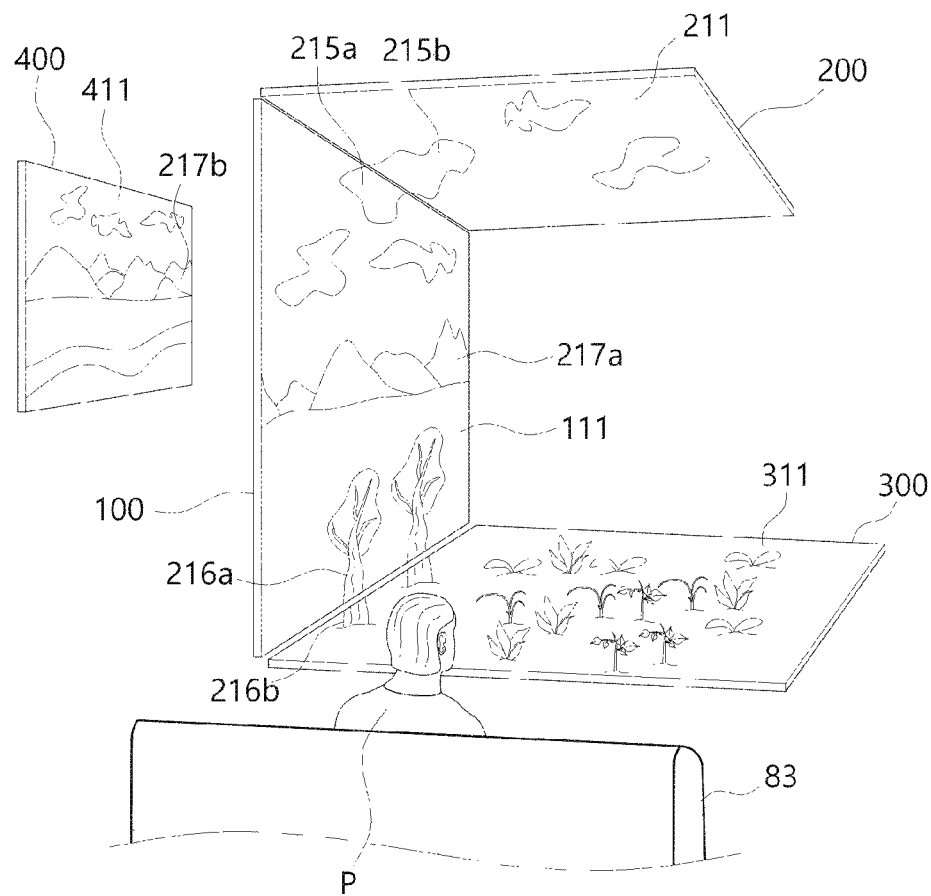
FIG. 17 is an exemplary view of the images displayed on displays viewed by the passenger in the first zone when the first and second displays are in the first zone according to the embodiment of the present disclosure.

FIG. 17 illustrates that the passenger (P) is seated on the couch 83 to view the images displayed on the first to fourth displays 100 to 400. Each of the second, third and fourth images 211, 311, and 411 may be the images that are subsequent to the first image 111 and extend from the first image 111. In FIG. 17, only a part 215a of a cloud is displayed as the first image 111, and another part 215b of the cloud is displayed as the second image 211 extending from the part 215a. A part 216a of a tree is displayed as the first image 111, and another part 216b of the tree is displayed as the third image 311 extending from the part 216a. In addition, a part 217a of a hill is displayed as the first image 111, and another part 217b of the hill is displayed as the fourth screen 311 extending from the part 217a. In this way, by displaying the second, third, and fourth images 211, 311, and 411 further extended from the first image 111 displayed on the first display 100 on the second, third, and fourth displays 200, 300, and 400, the passenger (P) may experience an immersive environment created by the images displayed on the side, top, and bottom, thereby enhancing the sense of realism and actuality.

Figure 18:
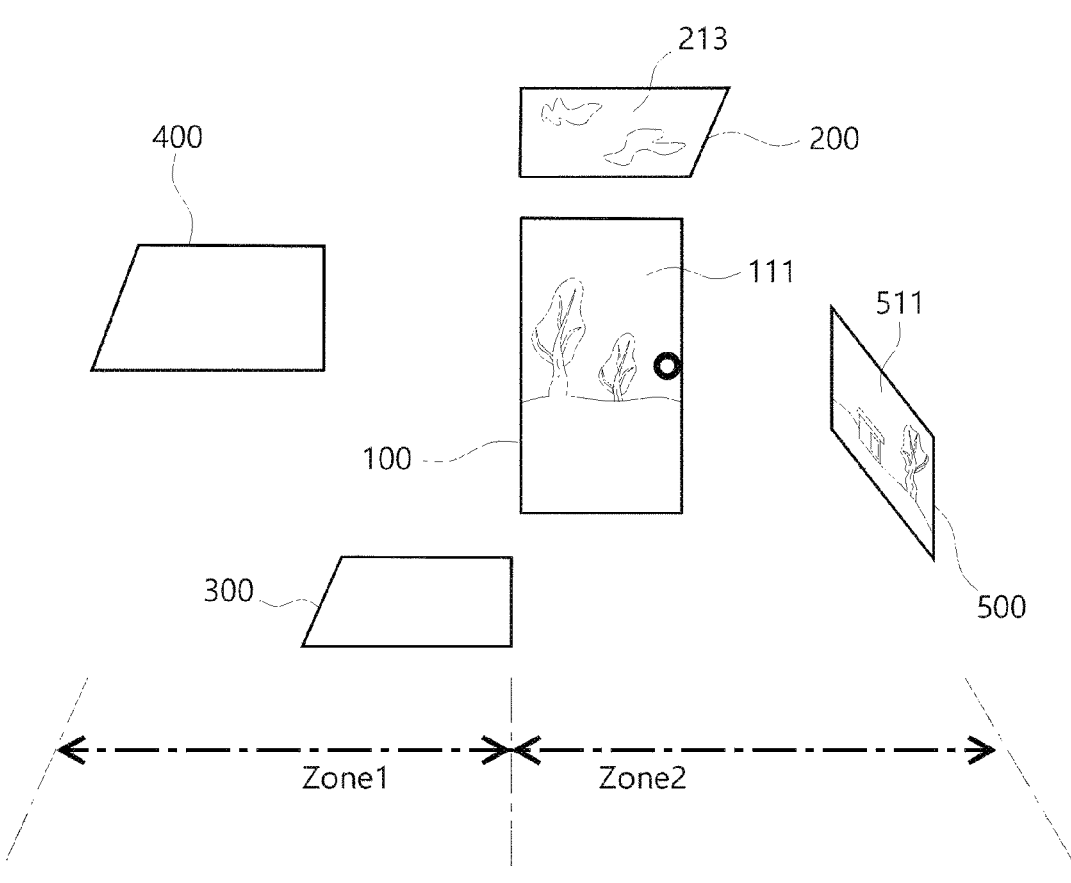
FIG. 18 is an exemplary view of images displayed on displays in the second zone when the first and second displays are in the second zone according to the embodiment of the present disclosure.

As shown in FIG. 18, a fifth image 511 may be displayed on the fifth display 500. The fifth image 511 may also be an image subsequent to the first image 111 or a separate image independent of the first image 111. An office image may be displayed on the fifth display 500 in the second zone. The fifth display 500 may display the fifth image 511 regardless of the position of the first and second displays 100 and 200. If the first and second displays 100 and 200 are in the second zone, the fifth image 511 may be an image subsequent to the first image 111.

FIG. 18 illustrates an example in which the first and second displays 100 and 200 are in the second zone and the fifth image 511 subsequent to the first image 111 is displayed on the fifth display 500 by extending the first image 111. When a camping virtual space is displayed as the first image 111, a further extended surrounding environment may be displayed as the fifth image 511 in the right direction in the camping virtual space. For example, trees and the like may be displayed as the fifth image 511 as the surrounding environment of the camping virtual space displayed in the first image 111.

Alternatively, in another embodiment, the first and second images 111 and 211 may be subsequent images of the fifth image 511. That is, the fifth image 511 may become the main content and the first and second images 111 and 211 may be images subsequent to the main content. For example, the camping virtual space may be displayed on the fifth display 500 as the fifth image 511, and the first display 100 may display trees and the like, as the left surrounding environment of the camping virtual space as the first image 111. And the second display 200 may display the sky, clouds, wind, birds, and the like as the upper surrounding environment of the camping virtual space as the second image 211. This may also be applied when an office image is displayed. For example, when a specific office document is displayed on the fifth display 500, the specific document may be extended and displayed on the first and second displays 100 and 200.

In another embodiment, while the first image 111 is being displayed on the first display 100, at least one of the second to fifth displays 200 to 500 may be turned off. Alternatively, any one of the first and second displays 100 and 200 may be turned off while the fifth image 511 is being displayed on the fifth display 500.

Figure 19:
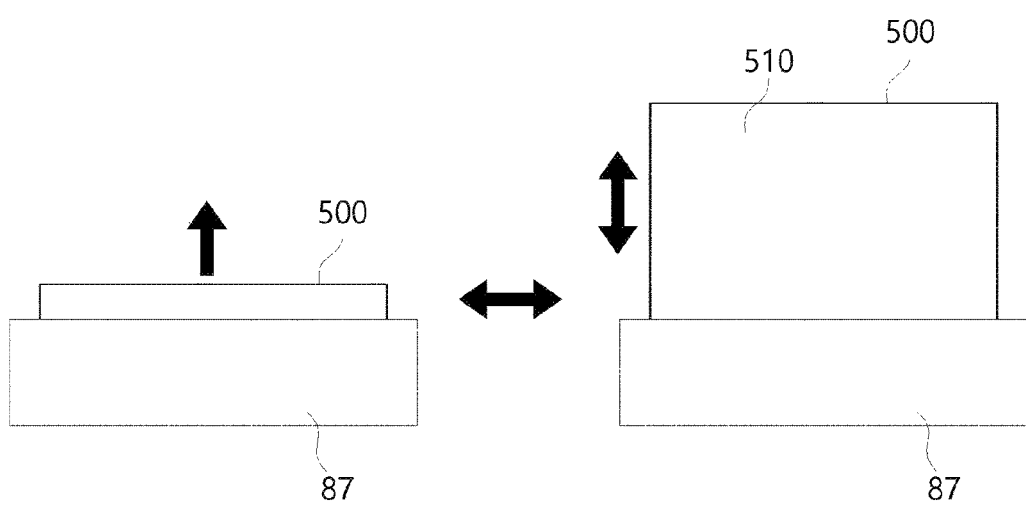
FIG. 19 is a view showing that the screen size of some displays varies according to the embodiment of the present disclosure.

The size of the fifth display 50 may be changed. FIG. 19 shows an example in which the size of the fifth display 500 is changed and the size of the displayed fifth image is changed. The fifth display 500 may be introduced into the desk 87 through an opening (not referenced) formed on the upper surface of the desk 87 according to the control signal of the processor 900, or conversely, may be drawn out by a predetermined length to the outside. When the fifth display 500 is not used, it may be lowered to the inside of the desk 87 so that it is not visible from the outside or only the minimum length may be visible. When the fifth display 500 is to be used, it may be raised to the outside of the desk 87. The rising height can be changed. An elevation device (not shown) for elevating the fifth display 500 may be disposed inside the desk 87. Alternatively, in another embodiment, the fifth display 500 may be a rollable display. The rollable display is supported by a support part (not shown) formed on the side. When the display is lowered, the display is rolled and lowered, and when it is raised, the rolled display may be unfolded while being supported by the support part.

Figure 20:
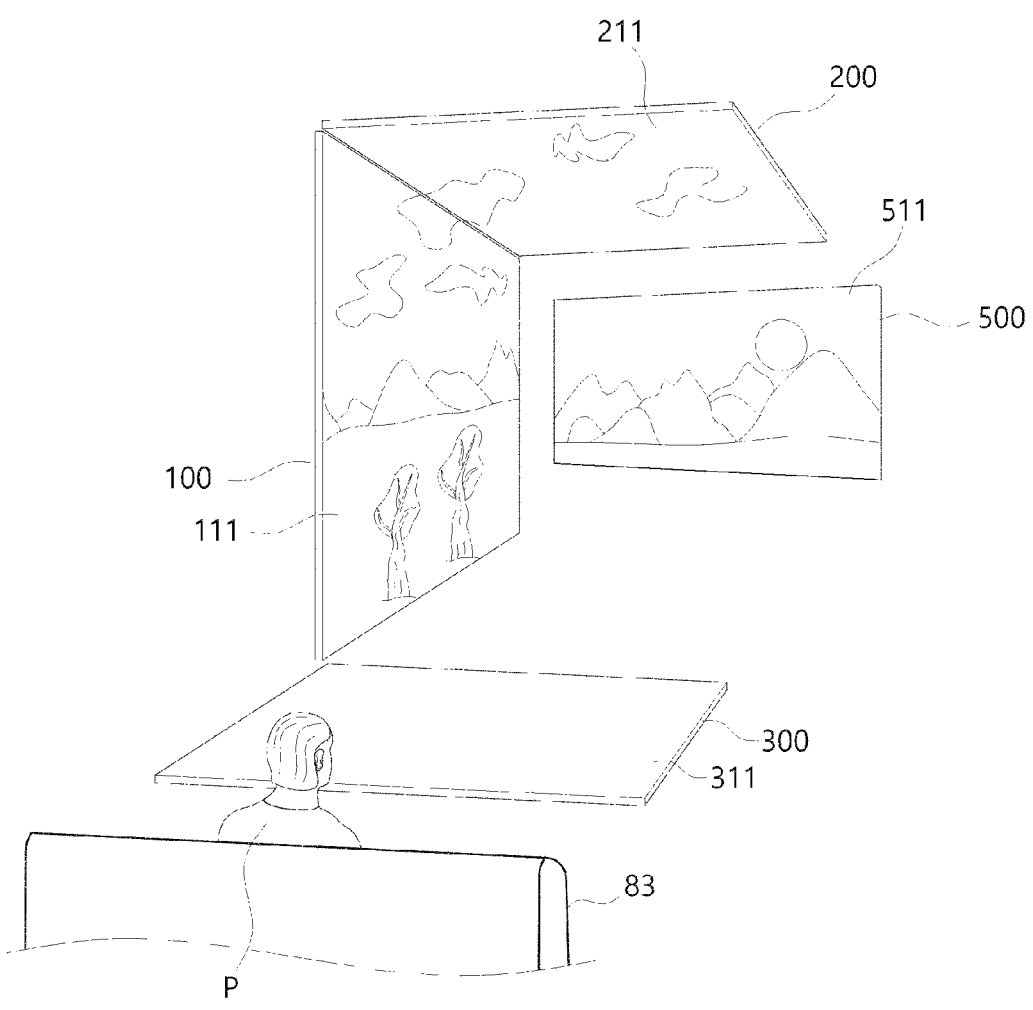
FIG. 20 is another exemplary view of the images displayed on displays viewed by the passenger in the first zone when the first and second displays are in the second zone according to the embodiment of the present disclosure.

FIG. 20 illustrates an example in which the passenger (P) is seated on the couch 87 to view the images displayed on the first, second, and fifth displays 100, 200, and 500. In the drawing, the first and second images 111 and 211 are subsequent to and extended from the fifth image 511 are displayed. In an example of FIG. 20, a sunrise screen is displayed as the fifth image 511, a tree around the sunrise is displayed as the first image 111, and the cloud above the sunrise is displayed as the second image 211. In this way, by displaying the first and second images 111, 211 further extended from the fifth image 511 of the fifth display 500 on the first and second displays 100 and 200, the passenger (P) may be provided with an environment in which the content may be enjoyed more realistically due to the screens displayed on the front, side, and top. In particular, when watching a movie, the main image of the movie is displayed on the fifth display 500 and the extended images of the movie are displayed on the first and second displays 100 and 200 so that the movie may be viewed more realistically.

Figure 21:
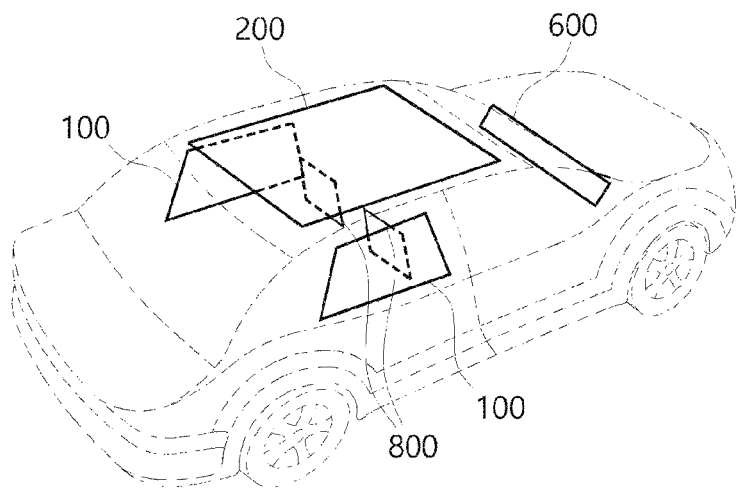
FIGS. 21 and 22 are views illustrating the display arrangement of the vehicle according to another embodiment of the present disclosure.
Figure 22:
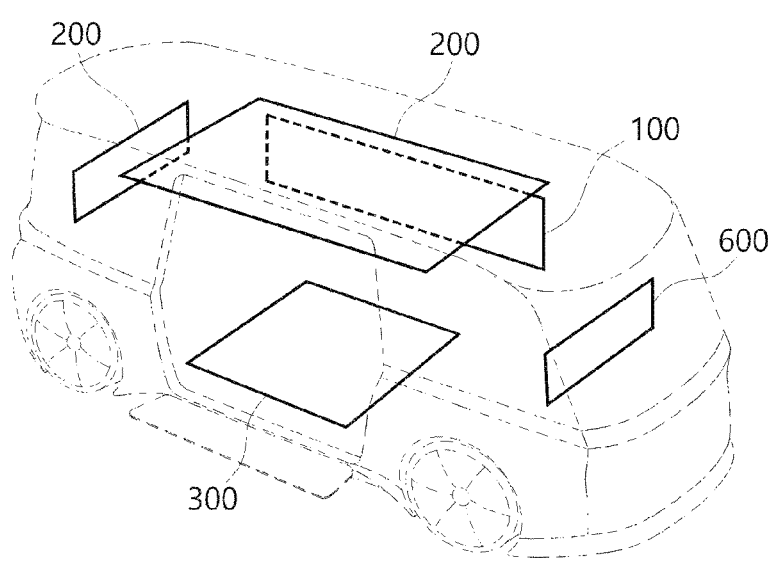

FIGS. 21 and 22 illustrate examples in which different types and numbers of displays are installed in different types of vehicles. The display device of the present disclosure may be applied to existing cars or vans. In addition, the number and shape of the displays installed in the vehicle may be changed. In FIG. 21, two displays 100 are installed on the side, and two displays 800 are installed in the center, one display 200 is installed in the upper surface, and one display 600 is installed on the outer front of the vehicle 10. In addition, the upper display 200 may be installed to have a size sufficient to almost fill the upper surface. In FIG. 22, displays 100, 200, and 300 are installed on the side, upper surface, and the lower surface, respectively, and displays 600 and 700 are installed on the outer front and rear of the vehicle 10, respectively. The side and the upper displays 100, 200 may be formed long in the front-rear direction (Dx) of the vehicle compared to the width direction (Dy) thereof.

As described above, in the present disclosure, some of the displays may be removed or additionally installed in other locations in consideration of the type of vehicle, the shape of the inner space (S), and the displayed content. In addition, some displays may also be changed in size and shape.

Figure 23:
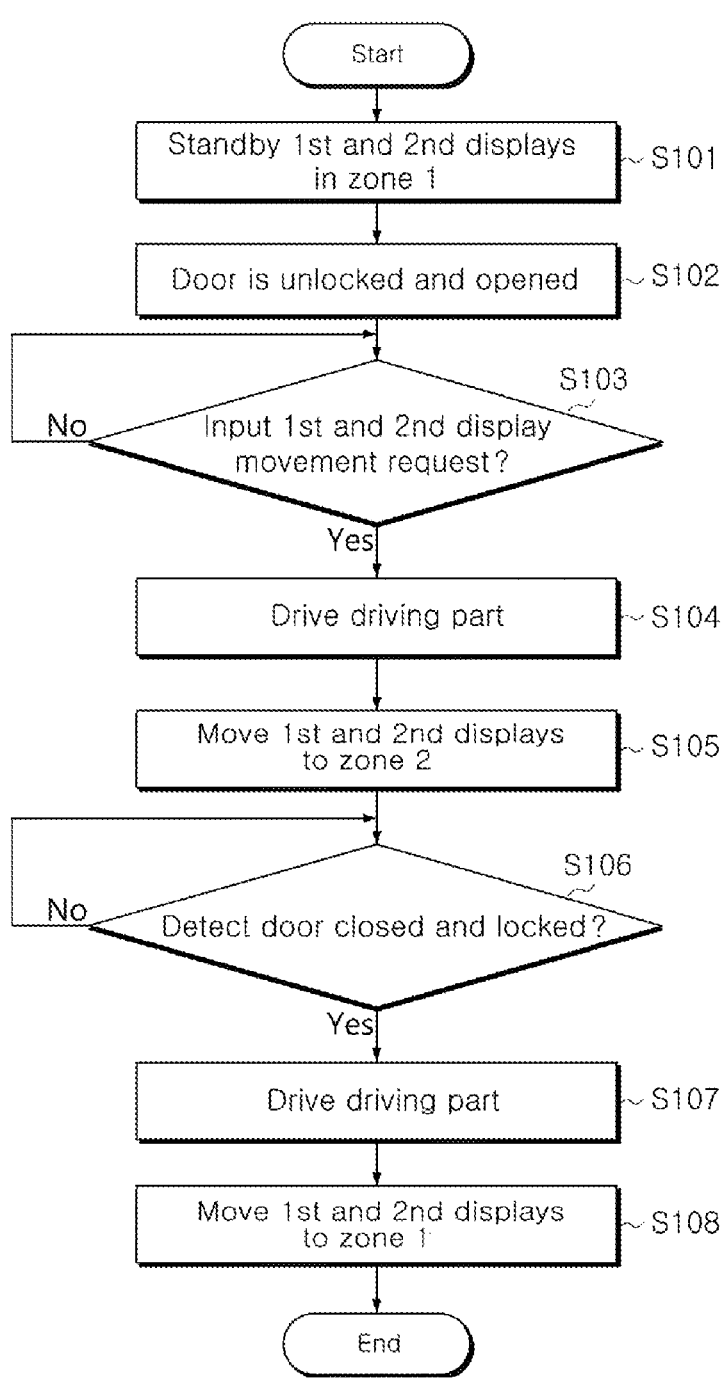
FIG. 23 is a flowchart illustrating a method of controlling the vehicle to move first and second displays between the first zone and the second zone, according to an exemplary embodiment of the present disclosure.
Figure 24:
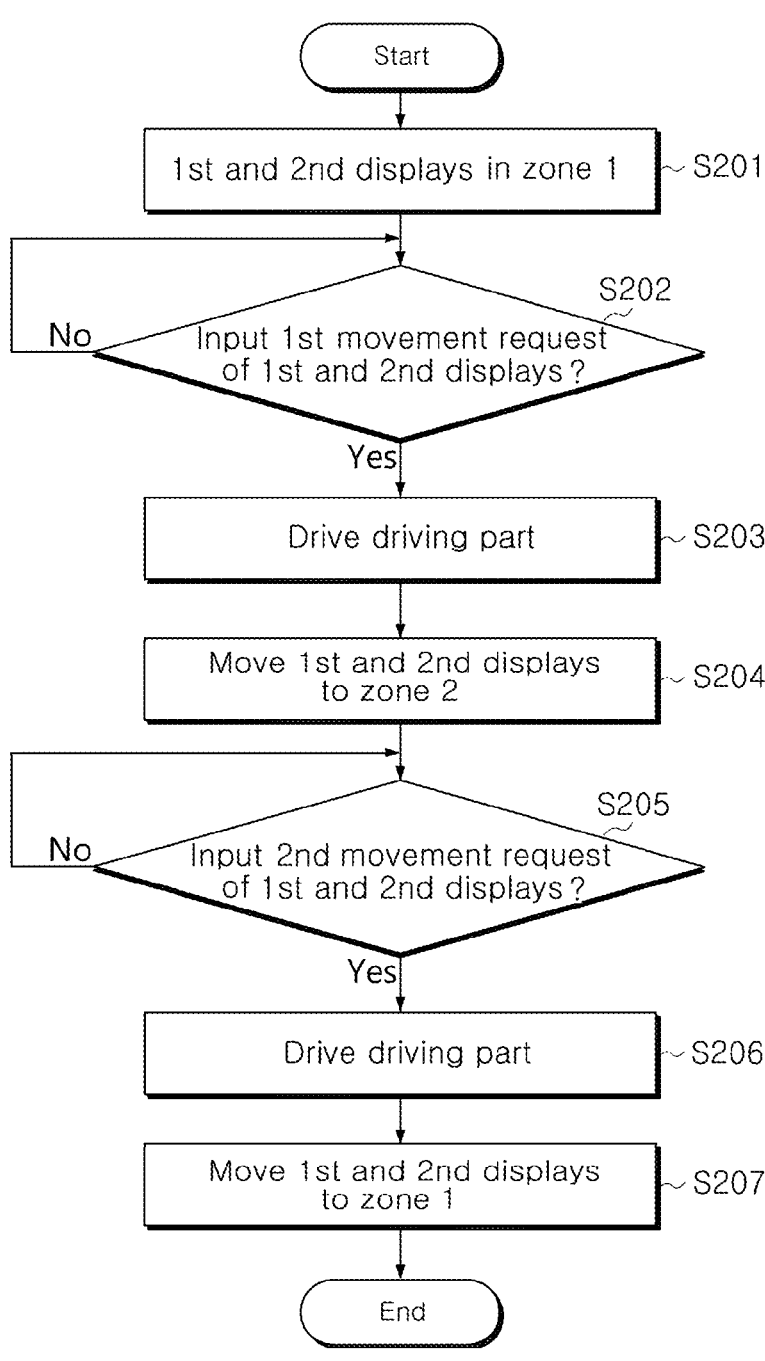
FIG. 24 is a flowchart illustrating a method of moving first and second displays between the first zone and the second zone according to another embodiment of the present disclosure.

FIG. 23 is a flowchart illustrating a method for moving the first and second displays between the first zone and the second zone as a method for controlling the vehicle according to the embodiment of the present disclosure. In the initial state, the first and second displays 100 and 200 are positioned in the first zone and stand by (S101). When the door 51 is unlocked and opened (S102) in the standby state, and a request to move the first and second displays 100 and 200 is input (S103), the processor 900 may drive the driving part 850 (S104) to move the first and second displays 100 and 200 in the first zone to the second zone. The first and second displays 100 and 200 may be moved to the second zone (S105) by driving of the driving part 850.

When the door 51 is opened, the door opening/closing sensor 55 may detect the door opening, and the processor 900 may receive the door opening signal from the door opening/closing sensor 55. The request to move the first and second displays 100 and 200 may be input in various ways. For example, a moving request may be input through a voice command of the passenger (P), and a moving request may be input through a specific application in a pre-registered mobile terminal of the passenger (P). In this case, unlike the opening and closing of the door 51, the locking and unlocking of the door 51 may be checked from the vehicle ECU 904.

When the door 51 is closed and locked (S106) in a state in which the first and second displays 100 and 200 are moved to the second zone, the processor 900 may drive the driving part 850 (S107) to move the first and second displays 100 and 200 in the second zone to the first zone. By driving the driver 850, the first and second displays 100 and 200 may move from the second zone to the first zone and return to the initial position (S108).

FIG. 23 is a flowchart illustrating a method for moving the first and second displays between the first zone and the second zone as a method for controlling the vehicle according to another embodiment of the present disclosure. In a state in which the first and second displays 100 and 200 are positioned in the first zone (S201), when a first moving request of the first and second displays 100 and 200 is input (S202), the processor 900 may drive the driving part 850 (S203) to move the first and second displays 100 and 200 to the second zone (S204). Here, the processor 900 may allow the first moving request to be input when the first sensing part 81 does not detect the passenger (P) in the first zone and the second sensing part 82 detects the passenger (P) in the second zone.

When the first and second displays 100 and 200 move to the second zone and then a second moving request of the first and second displays 100 and 200 is input (S205), the processor 900 drives the driving part 850 (S206) to move the first and second displays 100 and 200 to the first zone (S207). Here, the processor 900 may allow the second moving request to be input when the second sensing part 82 does not detect the passenger (P) in the second zone and the first sensing part 81 detects the passenger (P) in the first zone.

Figure 25:
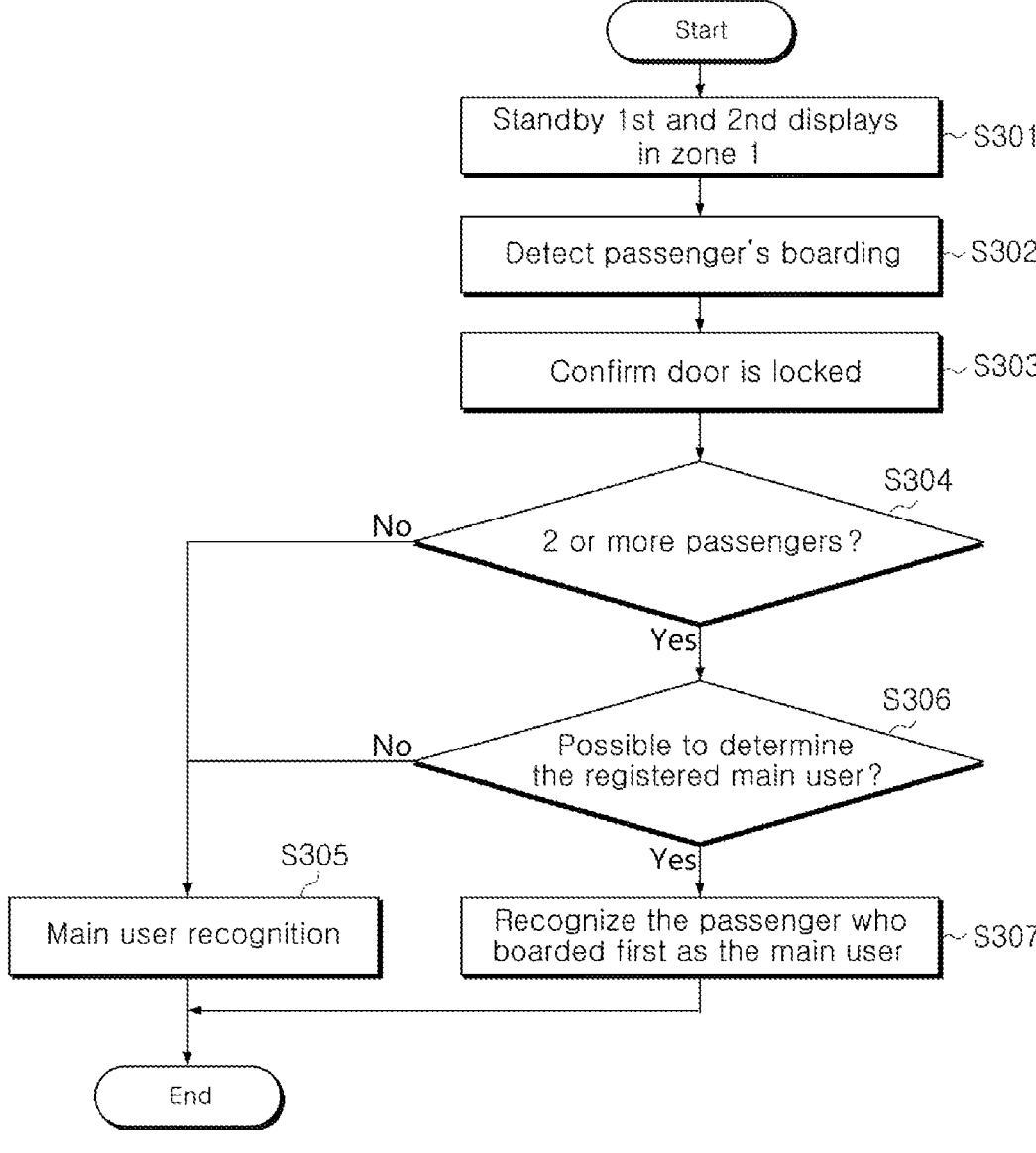
FIG. 25 is a flowchart illustrating a method of identifying a passenger in the vehicle according to the embodiment of the present disclosure.

FIG. 25 is illustrating a method of identifying a passenger (P) on the vehicle 10 as a method for controlling the vehicle according to another embodiment of the present disclosure. The first and second displays 100 and 200 are positioned in the first zone, which is the initial position, and stand by (S301). When it is detected that the passenger (P) is on the first zone (S302) and the door 51 is locked (S303), it is determined whether the passenger (P) is two or more (S304). If there is one passenger, the passenger is recognized as a main user (S305), and if there are two or more passengers, it is checked whether a pre-registered main user among them may be determined (S306). If the main user is determined, the main user is recognized (S 305). In step S305, if the main user may not be determined because the main user among the passengers is not on board, the passenger who boarded first is recognized as the main user (S307).

Figure 26:
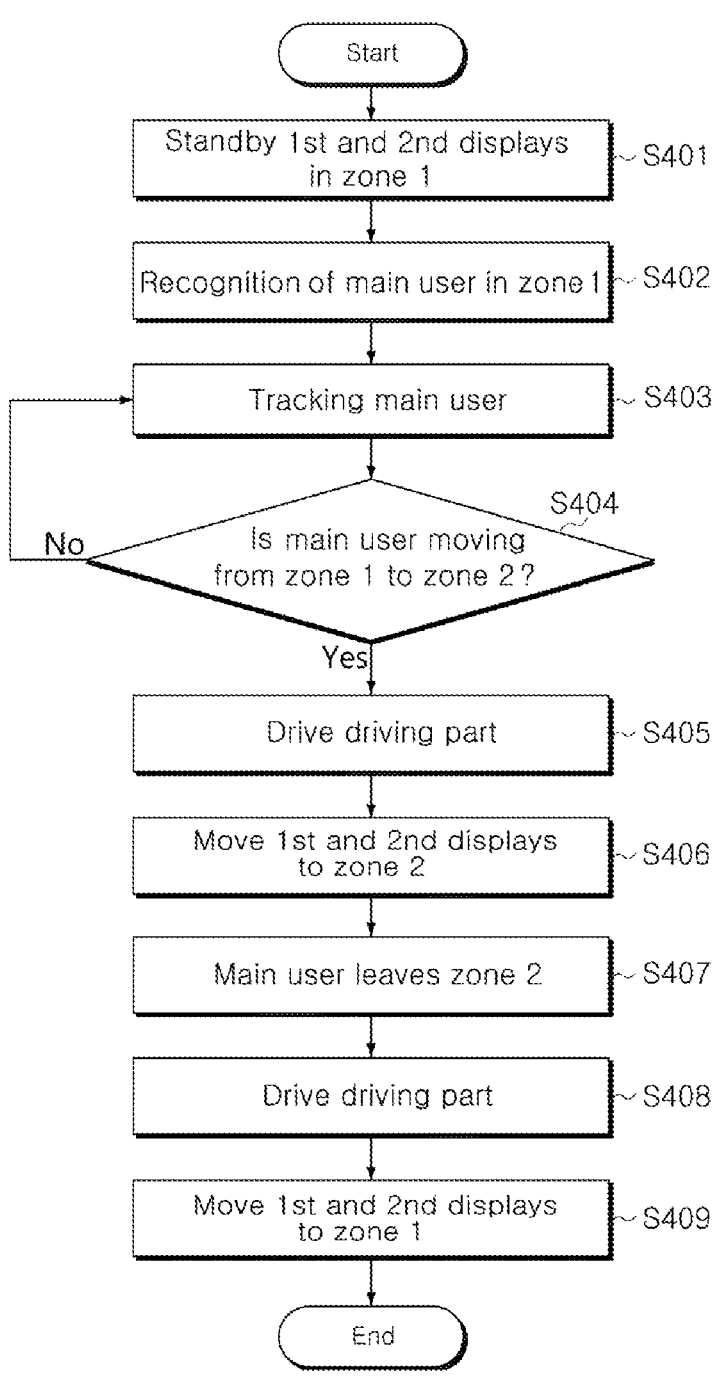
FIG. 26 is a flowchart illustrating a method of controlling the vehicle for moving first and second displays after recognizing a main user among passengers in the vehicle according to the embodiment of the present disclosure.

FIG. 26 is illustrating a method of moving first and second displays after recognizing a main user among passengers as a method for controlling the vehicle according to another embodiment of the present disclosure. In a state in which the first and second displays 100 and 200 are in the first zone (S401), when the main user is recognized (S402), the main user is tracked (S403). Here, tracking of the main user may be performed using the first and second sensing parts 81 and 82. The areas detectable by the first and second detection units 81 and 82 may overlap, and tracking of the main user may be possible by combining the sensing results from the first and second sensing parts 81 and 82. When the main user moves from the first zone to the second zone (S404), the processor 900 may drive the driving part 850 (S405) to move the first and second displays 100 and 200 from the first zone to the second zone (S406). When the main user leaves the second zone (S 407), the processor 900 may drive the driving part 850 (S408) to move the first and second displays 100 and 200 from the second zone to the first zone (S409). Whether the main user is in the first zone, leaving the first zone, being in the second zone, leaving the second zone, moving from the first zone to the second zone, and moving from the second zone to the first zone may all be detected by the first and second sensing parts 81 and 82.

Figure 27:
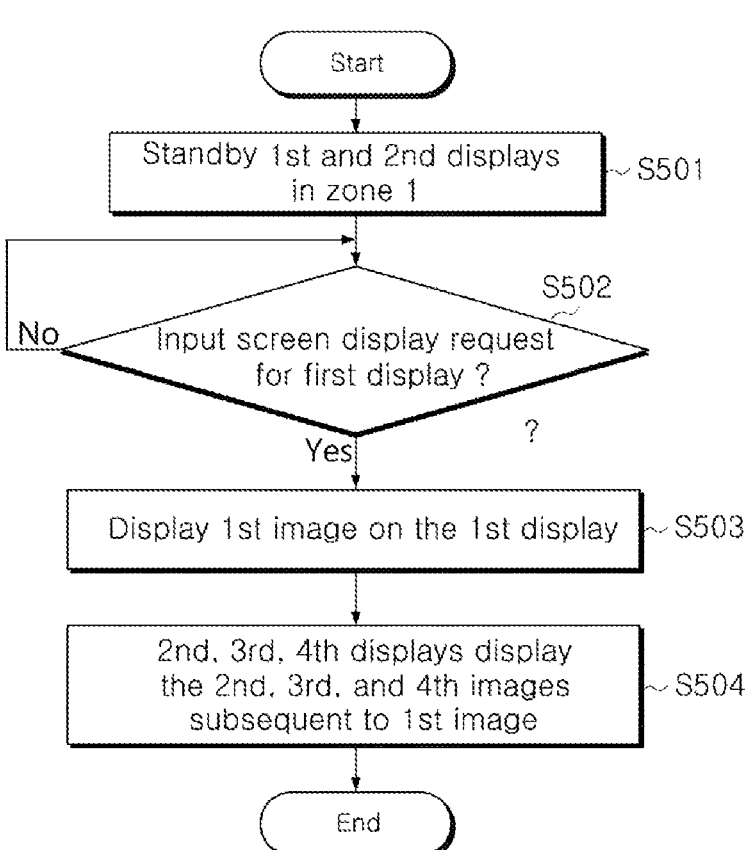
FIG. 27 is a flowchart illustrating a method of controlling the vehicle for displaying images on first to fourth displays according to the embodiment of the present disclosure.

FIG. 27 is illustrating a method of displaying images on the first to fourth displays as a method for controlling the vehicle according to another embodiment of the present disclosure. When the first display 100 receives a screen display request (S502) in a state in which the first and second displays 100 and 200 stand by in the first zone (S 501), the processor 900 may display the first image 111 on the first display 100 (S503). The processor 900 may display extended images of the first image 111 as the second, third, and fourth images 211, 311, and 411 subsequent to the first image 111 on the second, third, and fourth displays 200, 300, and 400 (S504).

Figure 28:
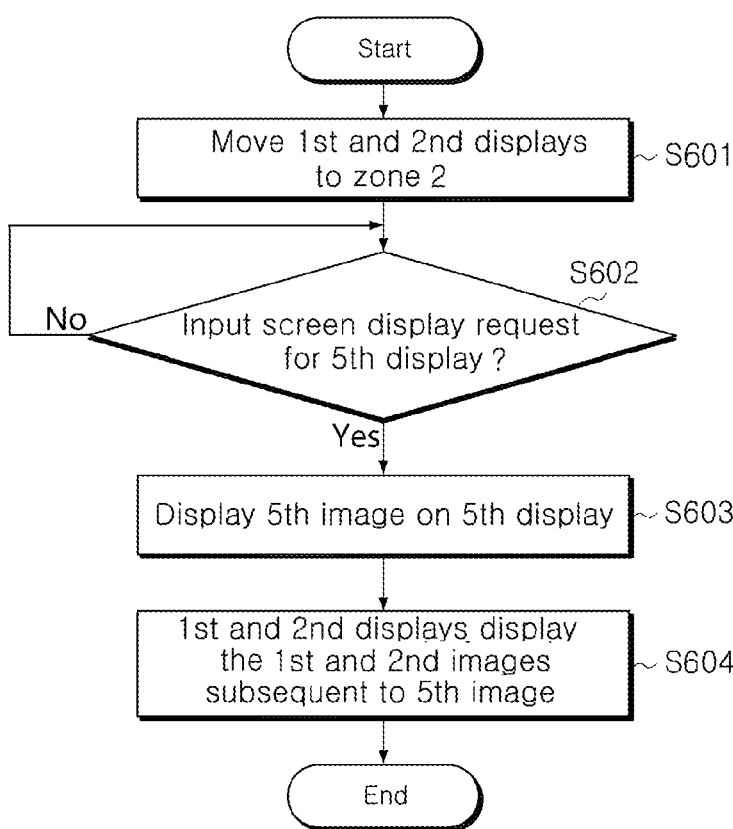
FIG. 28 is a flowchart illustrating a method of controlling the vehicle for displaying images on the first, second, and fifth displays according to the embodiment of the present disclosure.

FIG. 28 illustrates a method for displaying images on the first, second, and fifth displays as a method for controlling the vehicle according to another embodiment of the present disclosure. When a screen display request is input to the fifth display 500 (S602) while the first and second displays 100 and 200 are moved to the second zone (S602), the processor 900 may display the fifth image 511 on the fifth display 500 (S603). In addition, the processor 900 may display subsequent to and extended images of the fifth image 511 as the first and second images 111 and 211 on the first and second displays 100 and 200 (S604).

When a screen display request is input to the fifth display 500 as shown in FIG. 28, if the first and second displays 100 and 200 are not in the second zone but in the first zone, the processor 900 may drive the driving part 850 to move the first and second displays 100 and 200 to the second zone, and then display the images on the first, second, and fifth displays 100, 200, and 500.

As described above, in the display device and the vehicle according to the present disclosure, a plurality of displays are installed at various positions, independent images are displayed on each display, or some images are linked and extended, thereby enabling the passenger to enjoy content more enjoyable. By connecting and sharing peripheral devices such as audio devices, the sense of realism may be doubled and enjoyment may be further enhanced.

Meanwhile, the processor 900 may control the operation of the vehicle 10 in various forms. The processor 900 may control the operation of the vehicle 10 independently or in conjunction with the ECU 904. The processor 900 may analyze the information sensed by the sensing part and the captured image by the camera part, and control the operation of the vehicle 10 to correspond to the analyzed result. Specifically, the sensing part and the camera part detect the passenger's position, behavior and status, and transmit the detected result to the processor 900. The processor 900 may analyze the received detected result to control the operation of the vehicle 10 in response to the behavior and the status according to the position of the passenger.

In the method of controlling the vehicle 10 according to the present disclosure, the operation of the vehicle 10 may be differently performed according to the position of the passenger. That is, even if the same behavior and status is detected from the passenger, different result may be performed according to the position of the passenger. This means that the processor 900 controls the operation of the vehicle 10 differently depending on whether the passenger performs the same behavior in the first zone or the second zone.

Hereinafter, with reference to FIGS. 29 to 44, a method of controlling the vehicle according to the passenger's behavior and status will be described in detail through various embodiments.

Figure 29:
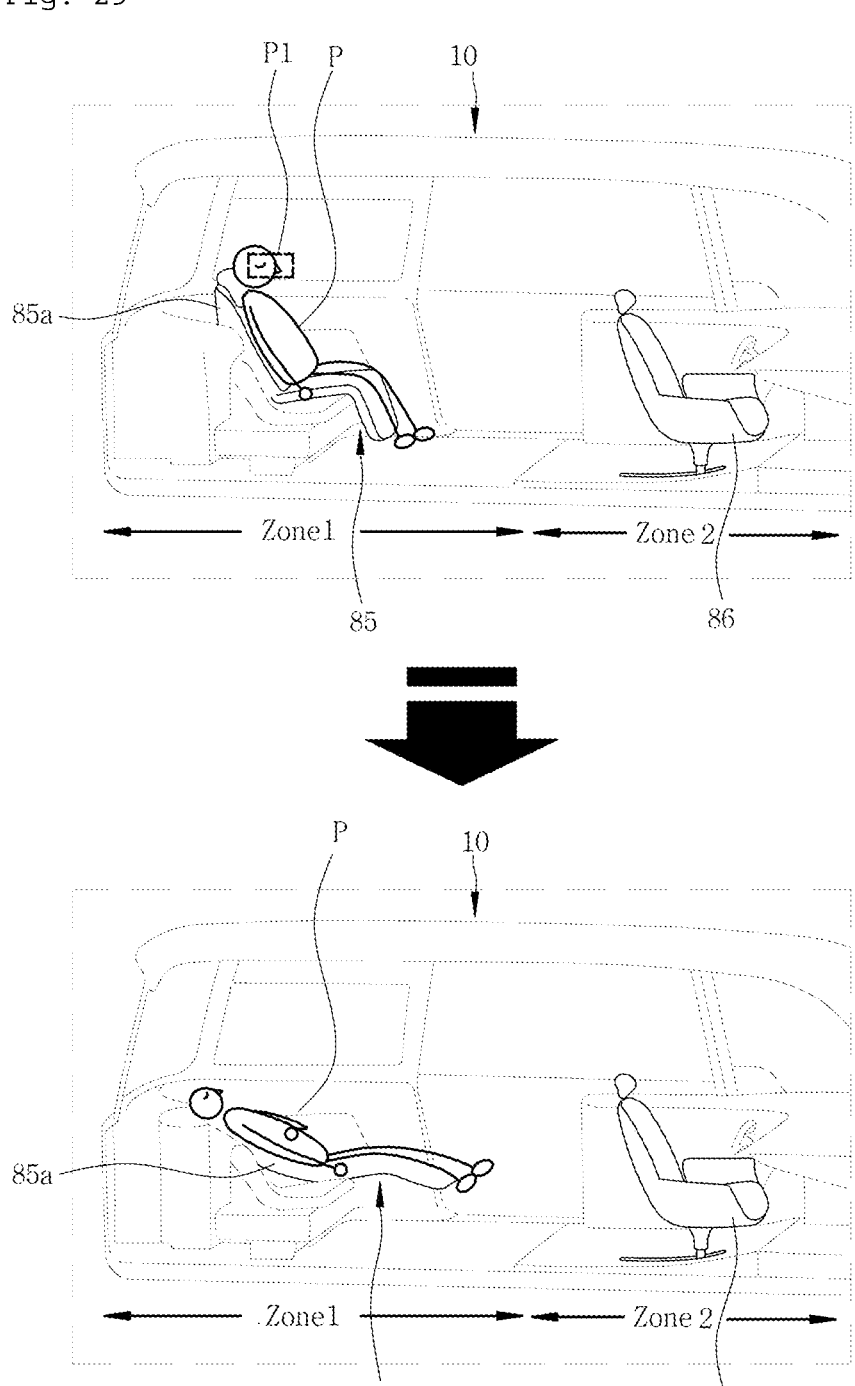
FIG. 29 is an exemplary diagram illustrating a control method of the vehicle when drowsiness of a passenger is detected in the first zone of the vehicle according to the embodiment of the present disclosure.
Figure 30:
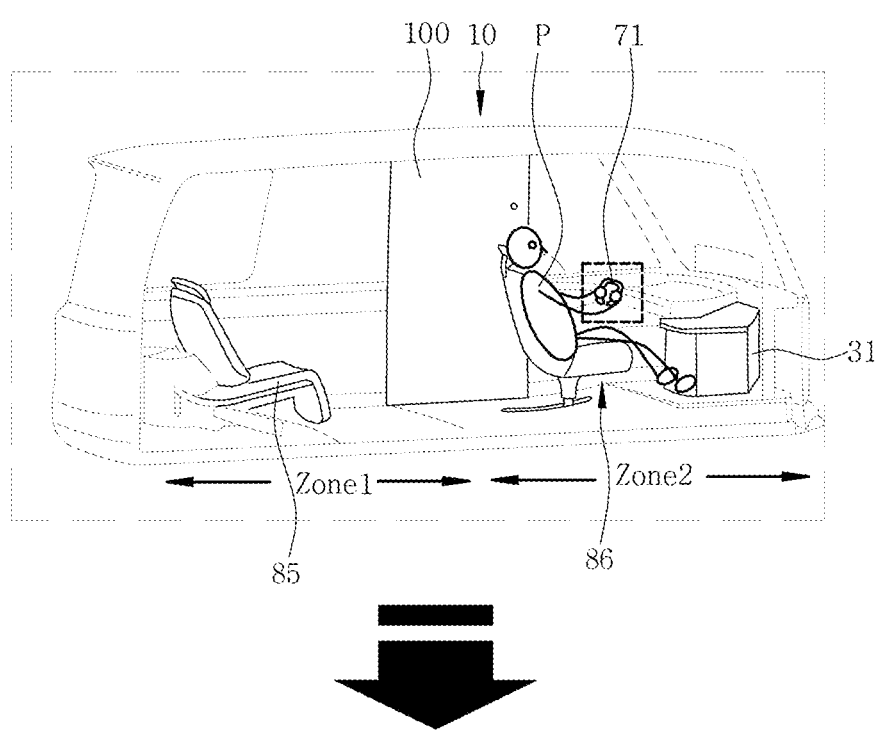
FIG. 30 is an exemplary diagram illustrating a control method of the vehicle when drowsiness is detected while a passenger is driving manually in the second zone of the vehicle according to the embodiment of the present disclosure.
Figure 30:
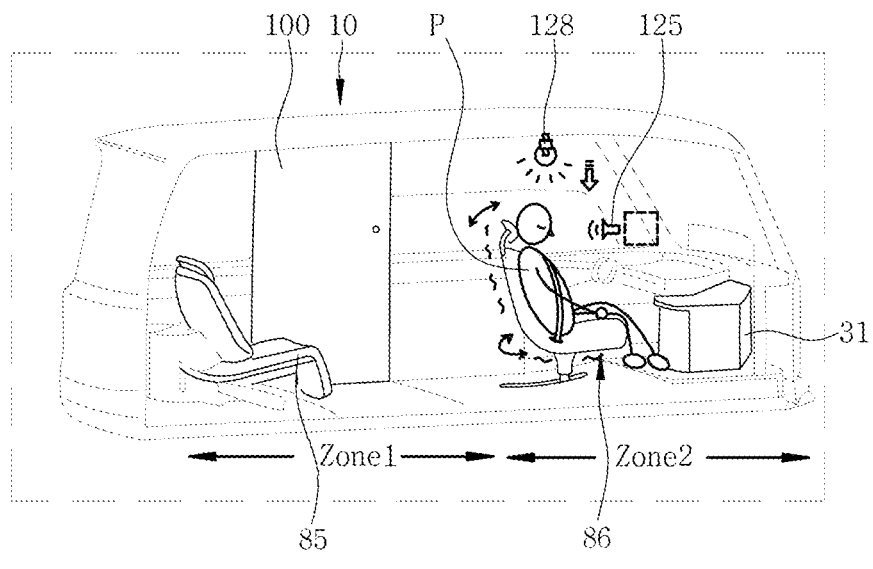
Figure 31:
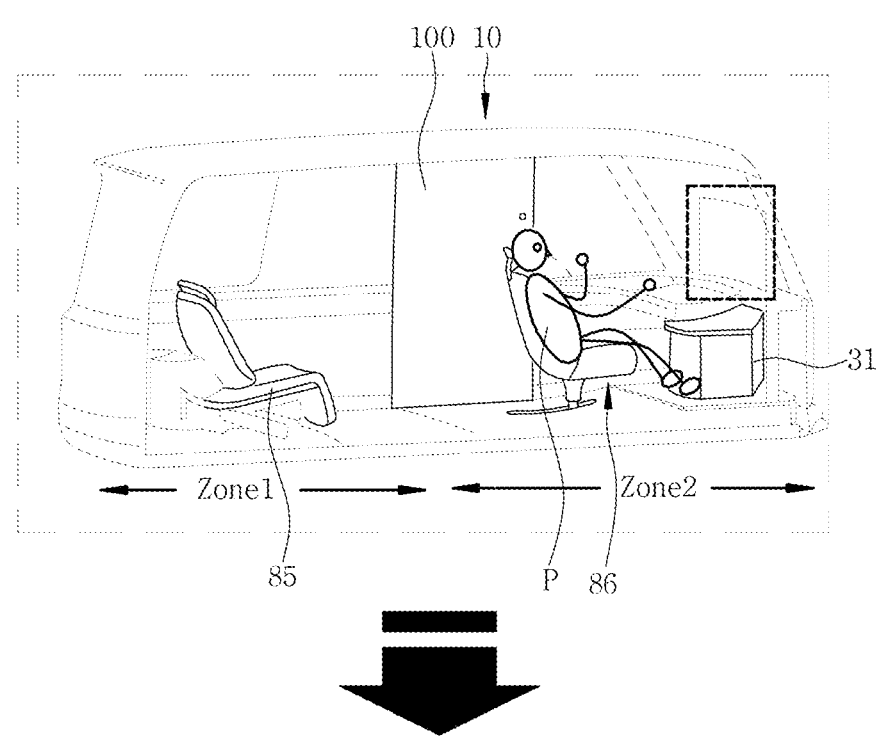
FIG. 31 is an exemplary diagram for illustrating a control method of the vehicle when drowsiness is detected while a passenger is working in the second zone of the vehicle according to the embodiment of the present disclosure.
Figure 31:
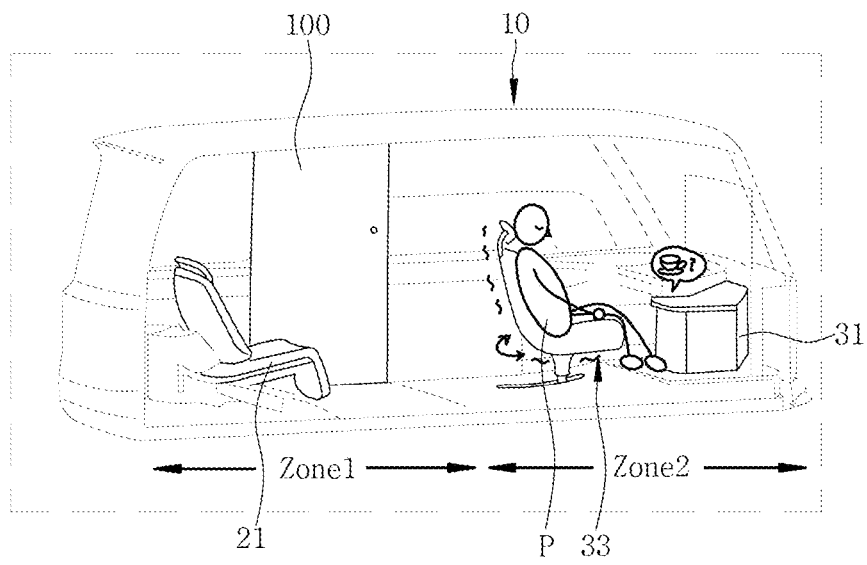

FIGS. 29 to 31 are views illustrating a method of controlling the vehicle when a passenger closes his or her eyes and becomes drowsy, as the embodiment of the present disclosure.

When there is the passenger in the vehicle 10, a passenger sensor 119 may detect the passenger and the location of the passenger. The passenger sensors 119 are installed in the first zone and the second zone, respectively. In addition, a sleep tracking camera 114 may detect the eye blinking time by checking the eye area (P1) of the passenger (P). Of course, in another embodiment, a camera may be combined with other sensor, a radar, a lidar, and the like to detect the passenger's location and blinking time. For example, a sleep tracking radar may be used instead of the sleep tracking camera 114.

The processor 900 may determine whether the passenger is drowsy using the eye blinking time sensed by the sleep tracking camera 114. For example, if the eye blinking time is 75 to 400 ms, it may be determined that the passenger is woken up, and if it is 400 ms or more, it may be determined that the passenger is in the drowsy state, and may be determined to be in the sleep state if it is 800 ms or more.

When the blinking time is greater than or equal to the set reference value (e.g. 400 ms), the processor 900 may perform the operation of the vehicle 10 differently depending on the location of the passenger.

As shown in the example of FIG. 29, when the passenger (P) is detected in the first zone and the blinking time of the passenger (P) is greater than the set reference value, the processor 900 determines that the passenger (P) intends to take a rest and controls the operation of the vehicle 10 to perform a process necessary for the rest. The process required for rest may include a process of adjusting the angle of the back sheet 85 constituting the rest chair 85 by driving the back seat driving part 85*b*. This may be intended to induce comfortable sleep for the passenger. In addition, as a process necessary for rest, at least one more process may be performed among a process of adjusting the illumination of the inner space to be suitable for sleep, a process of activating ASMR for sleep, and a process of turning off the display if it is on. Additionally, the processor 900 may operate the sleep tracking camera 114 to perform non-contact sleep tracking. Through this, it is possible to determine whether the passenger (P) remains asleep or wakes up from sleep.

Meanwhile, if the passenger (P) is detected in the second zone and the blinking time of the passenger (P) is greater than the set reference value, the processor 900 determines whether the passenger (P) is driving manually or at work. The determination of manual driving may be made by conforming from the ECU 904 of the vehicle 10 whether the steering wheel is out and the fifth display 15 is inserted into the desk 87 in driving mode. The determination of whether work is in progress may be confirmed by checking whether the steering wheel is in a state from the ECU 904 of the vehicle 10 and the fifth display 15 is protruding from the desk 87 to the outside in work mode.

As shown in the example of FIG. 30, when the passenger (P) is detected in the second zone and the eye blinking time of the passenger (P) is greater than or equal to the set reference value and, the passenger (P) is driving manually, the processor 900 may determine that the passenger (P) is drowsy and control the operation of the vehicle 10 to perform a process of waking up the drowsiness. The process of waking up the drowsiness may include, for example, a process of generating vibration on the office chair 86 on which the passenger (P) is seated. In addition, as the process of waking up the drowsiness, at least one process of tightening the seat belt connected to the chair 86, opening the window of the second zone, and adjusting the illumination brighter by controlling a lighting part 128 may be performed.

As shown in the example of FIG. 31, when the passenger (P) is detected in the second zone and the eye blinking time of the passenger (P) is greater than or equal to the set reference value and the passenger (P) is working, the processor 900 may also perform the process of waking up the passenger (P) from drowsiness. The process of waking up the drowsiness may be the same as the process of FIG. 30. In addition, a process of outputting a voice message for recommending a beverage in the refrigerator 31 may be further performed.

In addition, the sleep tracking camera 114 may detect the heart rate of the passenger (P). Alternatively, a front seat DSM camera 106, a rear seat PSM camera 113, and the passenger sensor 119 may also detect the heart rate of the passenger (P). For example, the sensors and the cameras may measure the heart rate by detecting motion information of clothes of in the chest area (P2) when the passenger (P) inhales and exhales.

The processor 900 may determine the status of the passenger (P) using the detected heart rate. For example, the processor 900 determines that the passenger is in a normal state if the heart rate is within the average range (60 to 100 bpm), in a sleep state if the heart rate falls below 10 bpm compared to the average range, in a tachycardia state if the heart rate is above the average range, and in a bradycardia state if the heart rate is less than 40 bps. In addition, the processor 900 may identify the regularity of the heartbeat, and may determine a pulse that is irregular and skipped.

Figure 32:
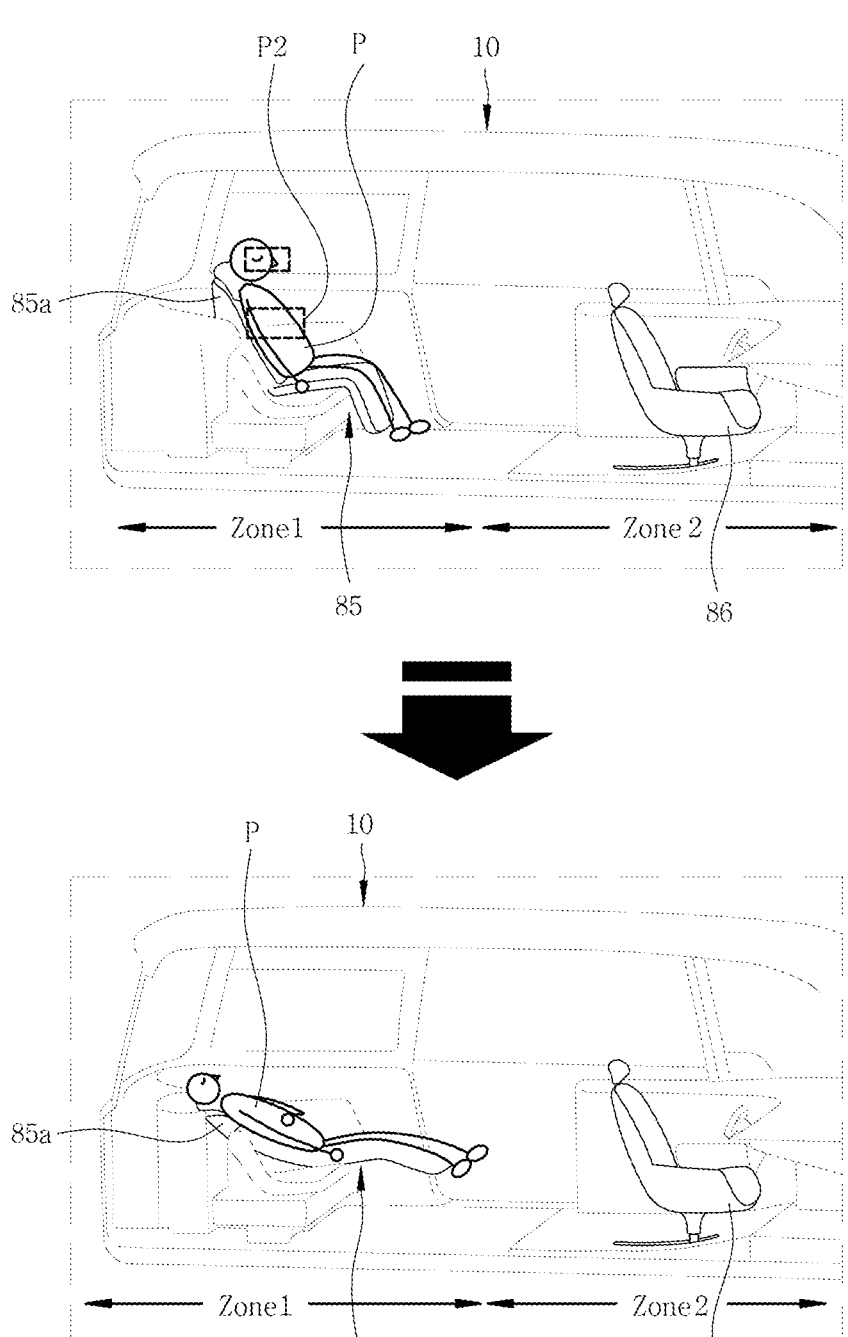
FIG. 32 is an exemplary diagram illustrating a control method of the vehicle when a heart rate of a passenger is detected in the first zone of the vehicle according to the embodiment of the present disclosure.

As shown in the example of FIG. 32, when the passenger (P) is detected in the first zone and the heart rate of the passenger (P) is lowered to a predetermined value or more with respect to the average range, the processor 900 may determine that the passenger (P) enters the sleep state and control the operation of the vehicle 10 to perform a necessary process for sleep. The process necessary for sleep may include a process of adjusting the angle of the back sheet 85*a* of the chair 85 by driving the back seat driving part 85*b*. This is intended to allow passengers to sleep comfortably. In addition, as a necessary process for sleep, at least one of a process may be further performed: adjusting the illumination appropriately for sleep; activating ASMR for sleep; and turning off the display if it is on. In addition, the processor 900 may operate the sleep tracking camera 114 to perform non-contact sleep tracking. Accordingly, it is possible to determine whether the passenger (P) maintains a sleep state or wakes up from the sleep state.

Figure 33:
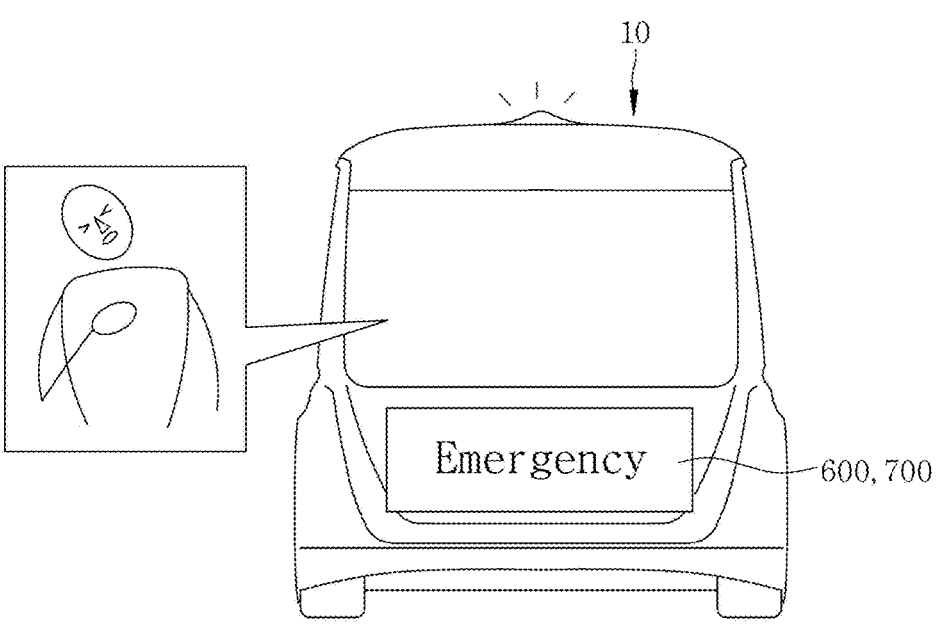
FIG. 33 is an exemplary diagram illustrating a control method of the vehicle when a heart rate of a passenger is detected in the second zone of the vehicle according to the embodiment of the present disclosure.

As shown in the example of FIG. 33, when the passenger (P) is detected in the second zone and the heart rate of the passenger (P) is out of the average range, the processor 900 may determine that an abnormality has occurred in the passenger (P) and control the operation of the vehicle 10 so that the process necessary for safety of the passenger (P) is performed. The process necessary for safety includes a process of switching to an autonomous driving mode when the vehicle 10 is an autonomous vehicle. This may be in case the passenger is unable to drive manually. If the time when the heart rate is out of the average range is maintained for more than a set time, the processor 900 may further perform at least one of a process of connecting a phone call to a preset emergency rescue service center and transmitting the location information, and a process of informing the outside of an emergency situation through the sixth and seventh displays 600 and 700. Additionally, the processor 900 may control the output of a voice message recommending replacement of the driver when there are two or more passengers.

In addition, the body temperature of the passenger (P) may be detected by the front seat thermal imaging camera 102 and the rear seat thermal imaging camera 117. The front seat thermal imaging camera 102 may detect the body temperature of the passenger (P) in the second zone, and the rear seat thermal imaging camera 117 may detect the body temperature of the passenger (P) in the first zone.

The processor 900 may determine the status of the passenger (P) by using the body temperature detected by each of the thermal imaging cameras 102 and 117. When the body temperature is in an average range (for example, 37 to 38° C.), it may be determined as a normal state, and may be determined as an abnormal state when the body temperature is greater than or equal to the average range or is less than or equal to the average range.

Figure 34:
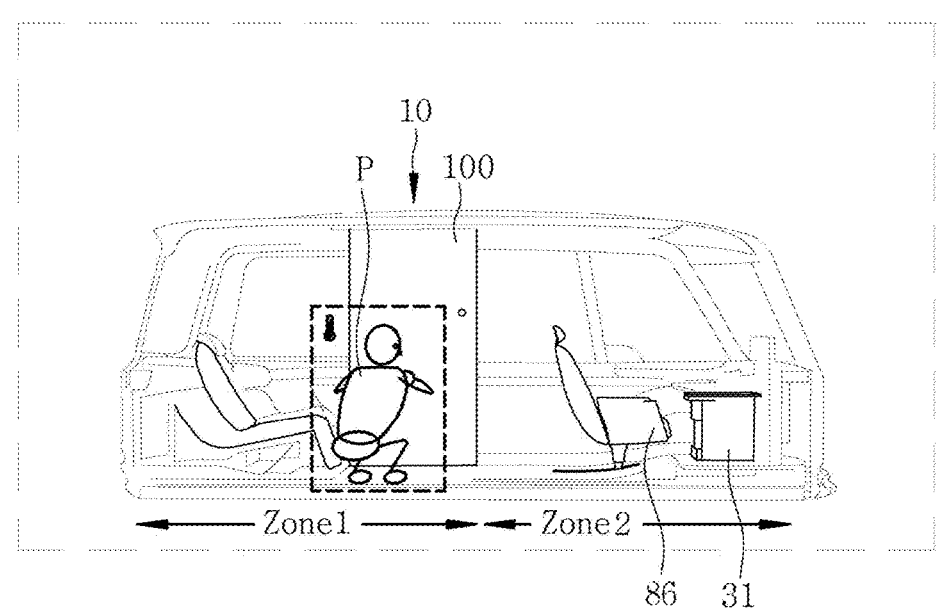
FIG. 34 is an exemplary diagram illustrating a control method of the vehicle when a body temperature of a passenger is detected in the first zone of the vehicle according to the embodiment of the present disclosure.
Figure 35:
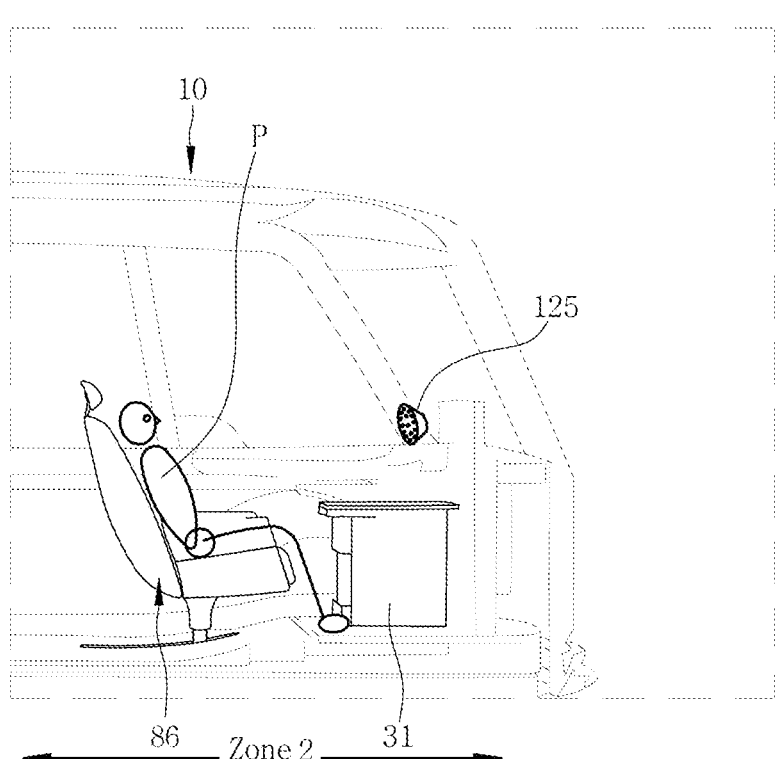
FIG. 35 is an exemplary diagram illustrating a control method of the vehicle when a body temperature of a passenger is detected in the second zone of the vehicle according to the embodiment of the present disclosure.

As shown in the example of FIG. 34, when the passenger (P) is detected in the first zone and the body temperature of the passenger (P) is above the average range, the processor 900 may determine that the passenger (P) is in exercising and may control the operation of the vehicle 10 to perform a process for maintaining an appropriate temperature for exercise. In this case, in the process of determining whether the passenger (P) is exercising, the behavior detected by the fitness camera 107 or the left/right gesture cameras 111 and 118 may be referred to. The process for maintaining an appropriate temperature for exercise may include adjusting the air conditioning in the first zone. For example, an air conditioning system (not shown) may be operated to deliver cold wind to the first zone. In addition, process for maintaining an appropriate temperature for exercise, at least one or more processes may be included: a process of displaying an image related to exercise on the display; a process of outputting a voice message recommending drinking water and beverages; and a process of playing music suitable for exercise.

If the body temperature of the passenger (P) is above the average range or the time out of the average range is continued for a set time even though not in exercising, the processor 900 may perform a a process for safety. As a process for safety, at least one of a process of switching to a telemedicine mode to connect to a hospital, a process of searching for a nearby hospital and moving to the searched hospital in an autonomous driving mode, and a process of notifying a situation by calling a family member or friend may be further performed. Determining that the passenger (P) is not exercising may refer to a result detected by the fitness camera 107 or the left/right gesture cameras 111 and 118.

As shown in the example of FIG. 34, when the passenger (P) is detected in the second zone and the body temperature of the passenger (P) is above the average range, the processor 900 may determine that the passenger (P) is in an emotional state and control the operation of the vehicle 10 to perform a stabilization process. In this case, the results detected by the front seat DSM camera 106, the rear seat PSM camera 113, and the passenger sensor 119 may be used in determining that the passenger is in an emotional unstable state. For example, it may be determined whether the passenger (P) is emotionally unstable by analyzing his or her facial expression. The stabilization process may include at least one of: outputting a voice message encouraging to stop and rest for a while and take a break; outputting a voice message recommending to drink a beverage; and playing soft music.

If the body temperature continues to be above the average range even though the passenger (P) is not emotionally agitated, the processor 900 may perform a safety process as shown in FIG. 33. The safety process may include, for example, switching to telemedicine mode to connect to a hospital, searching for a nearby hospital and moving to the searched hospital in an autonomous driving mode, and notifying a situation by calling a family member or friend.

Additionally, in the vehicle 10, the foot sensor 126 may detect whether the passenger (P) is wearing shoes (shoes on) or taking off shoes (shoes off). The foot sensor 126 may be installed in the first zone and the second zone, respectively. The processor 900 may control the vehicle 10 to perform different operations depending on the position of the passenger (P) and the shoe on/off detection result.

Figure 36:
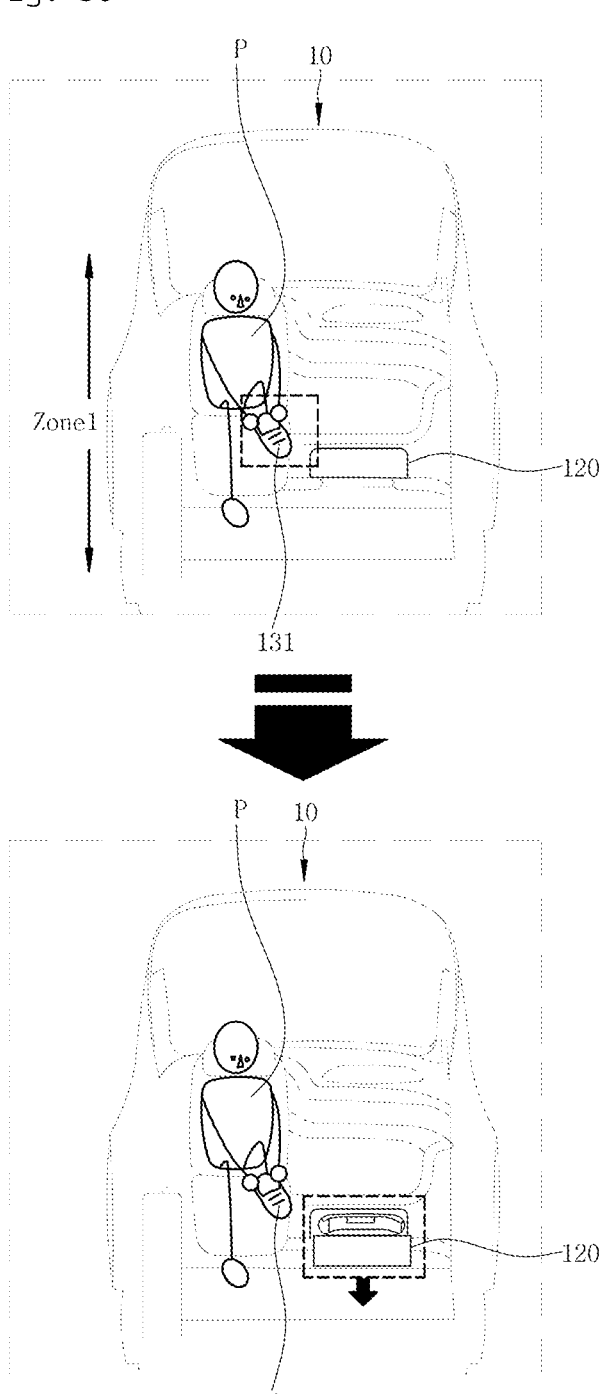
FIG. 36 is an exemplary diagram illustrating a control method of the vehicle when a shoe of a passenger is taken off in the first zone of the vehicle according to the embodiment of the present disclosure.

As shown in the example of FIG. 36, when the passenger (P) is detected in the first zone and a shoe 131 of the passenger (P) are removed, the processor 900 allows the passenger (P) to change the shoes 131. The processor 900 may control the vehicle 10 to perform a process for changing shoes by determining the behavior to be reported. For example, the process for changing shoes may include driving the shoe styler driving part 120a to open the door of the shoe styler 120.

Figure 37:
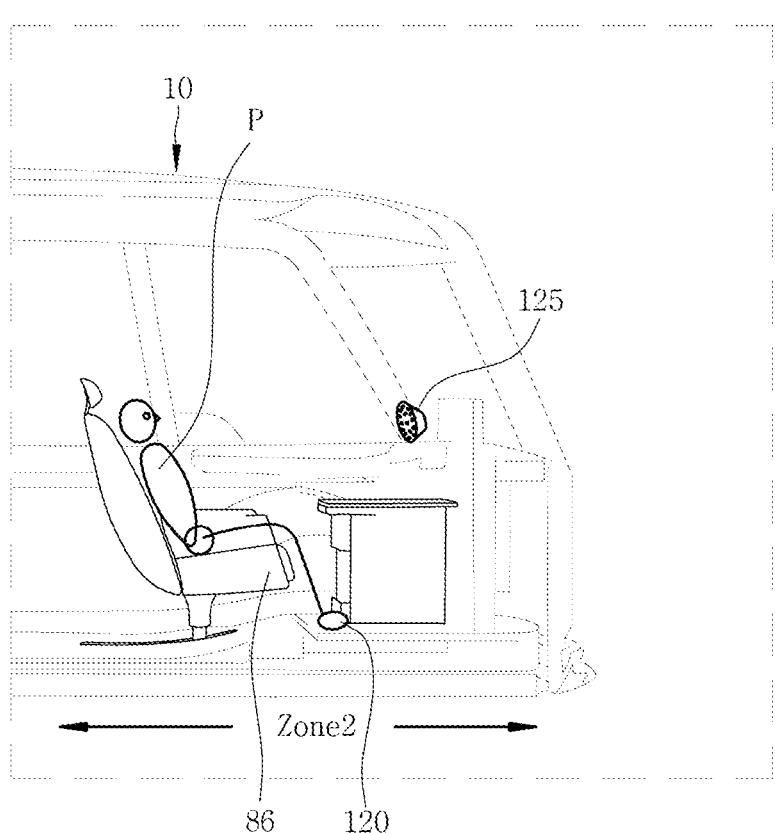
FIG. 37 is an exemplary diagram illustrating a control method of the vehicle when a shoe of a passenger is taken off in the second zone of the vehicle according to the embodiment of the present disclosure.

As shown in the example of FIG. 37, when the passenger (P) is detected in the second zone and a shoe of the passenger (P) is removed, the processor 900 may determine that the shoe of the passenger (P) has been unintentionally removed and control the operation of the vehicle 10 to perform a safety process. The process for safety may include, for example, a process of outputting a voice message notifying shoe off.

In addition, in the vehicle 10, the left and right gesture cameras 111 and 118 may detect a gesture of the hand area (P3) of the passenger (P). In the present embodiment, the left/right gesture cameras 111 and 118 may detect an action in which the passenger (P) performs hand fanning with his or her hand. Alternatively, as another example, the voice of the passenger (P) may be recognized by the microphones 101 and 108. In this embodiment, a voice related to 'hot' may be recognized. For example, among the voices of the passenger (P), voices such as "hot", "It's hot", and "It seems to be hot" may be recognized. The processor 900 may control the vehicle 10 to perform different operations depending on the location of the passenger (P) when the hand fanning or a voice related to 'hot' is recognized.

Figure 38:
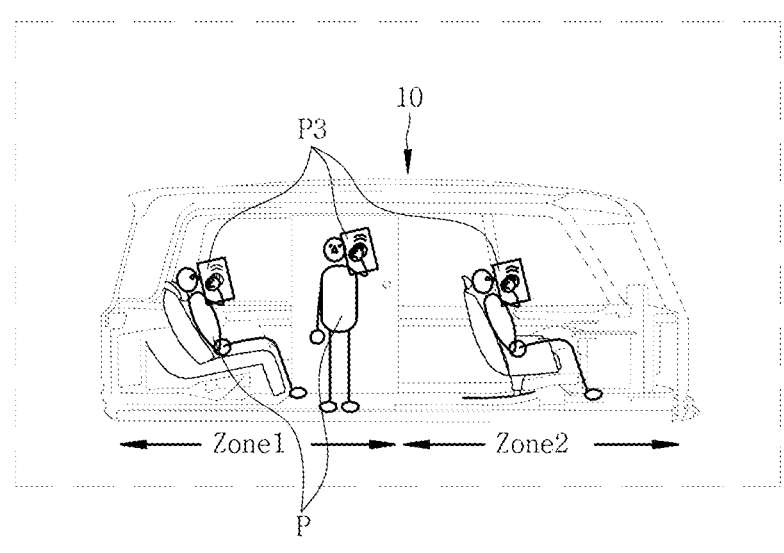
FIG. 38 is an exemplary diagram illustrating a control method of the vehicle when a passenger's fanning gesture is detected in the first zone and the second zone of the vehicle according to the embodiment of the present disclosure.
Figure 38:
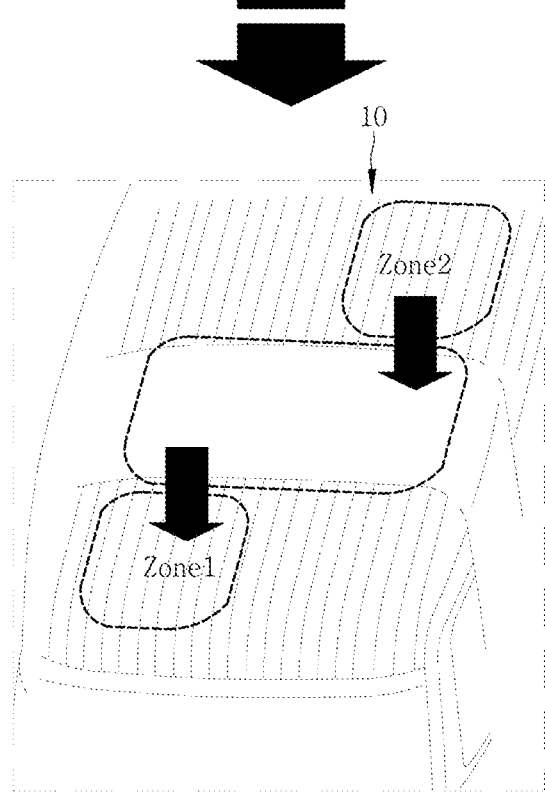

As shown in the example of FIG. 38, when the passenger (P) is detected in the first zone and the fanning behavior of the passenger (P) is detected, the processor 900 determines that the space in which the passenger (P) is located is hot and controls the vehicle 10 to perform a process of creating a space at an appropriate temperature. The process of creating an appropriate temperature may include adjusting the air conditioning in the first zone. For example, an air conditioning system (not shown) may be operated to deliver cold wind to the first zone. The air conditioning adjustment may be performed by selecting a partial air conditioning for the location where the passenger (P) is located and overall air conditioning for the first zone. Additionally, process of creating an appropriate temperature may further include at least one of opening the window of the vehicle 10 and outputting a voice message recommending drinking a beverage from the refrigerator.

Even when the passenger (P) is detected in the second zone, the same process may be performed. That is, when the passenger (P) is detected in the second zone and the hand fanning of the passenger (P) is detected, the processor 900 may control the vehicle 10 to adjust the air conditioning to the second zone.

Meanwhile, in the process of adjusting the air conditioning in response to hand fanning, the processor 900 may determine whether to change the air conditioning by referring to the temperature of the inner space measured by the temperature sensor 122. For example, when hand fanning is detected, the inner temperature may be checked and the air conditioning may be changed if the inner temperature is above a preset average temperature (17 to 24° C.).

In addition, in the vehicle 10, the operation of the vehicle 10 may be controlled by combining the voice of the passenger (P) recognized by the microphones 101 and 108 and the behavior and status of the passenger (P) detected by the sensor part and camera part.

Figure 39:
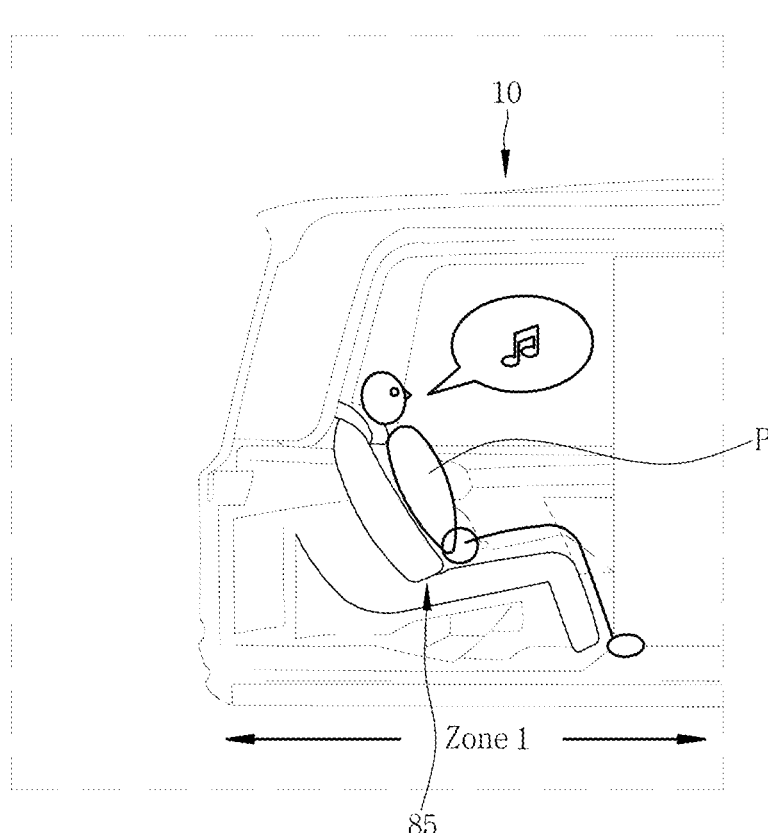
FIG. 39 is an exemplary diagram illustrating a control method of the vehicle when a passenger's voice is recognized in the first zone of the vehicle according to the embodiment of the present disclosure.
Figure 40:
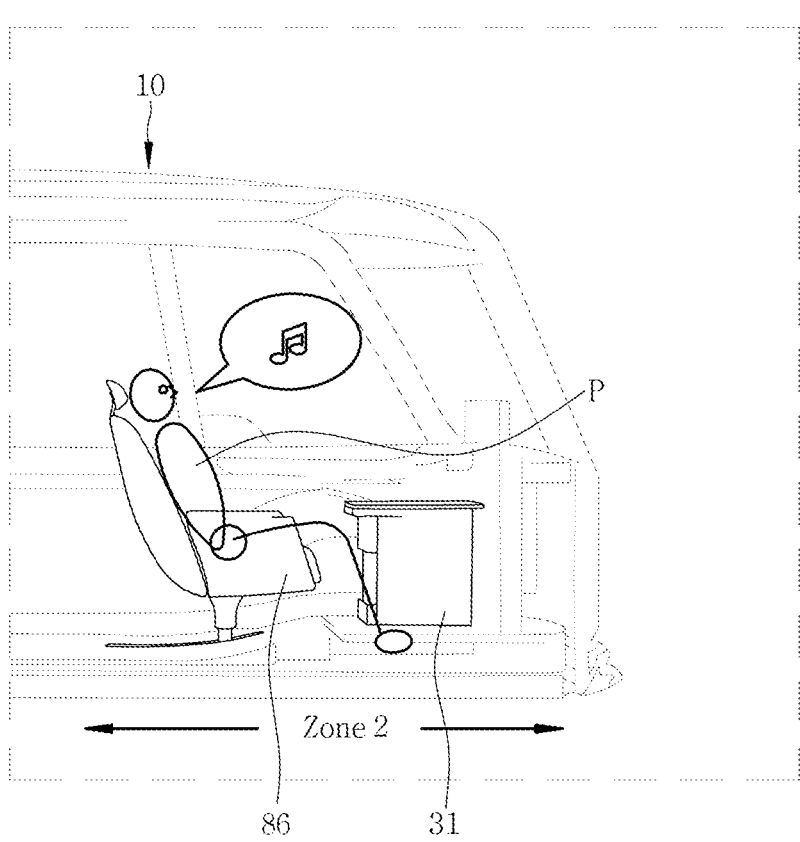
FIG. 40 is an exemplary diagram illustrating a control method of the vehicle when a passenger's voice is recognized in the second zone of the vehicle according to the embodiment of the present disclosure.

As shown in the example of FIG. 39, when the passenger (P) is detected in the first zone and a voice requesting music is recognized by the microphones 101 and 108, the processor 900 may control the operation of the vehicle 10 to perform a process for playing music by determining that the passenger (P) wants to listen to music. The process for playing music may include, for example, at least one of a process of playing music through the speaker 125, a process of adjusting the volume of the speaker 125 in the location of the passenger (P), and a process of displaying an image related to the music on the display. As shown in the example of FIG. 40, the same may be applied even when the passenger (P) is detected in the second zone.

Additionally, in the vehicle 10, at least one of the front seat DSM camera 106, the rear seat PSM camera 113, and the passenger sensor 119 may detect that the passenger (P) is consuming food 132. Alternatively, the left/right gesture cameras 111 and 118 may also detect whether the passenger (P) consumes food.

Figure 41:
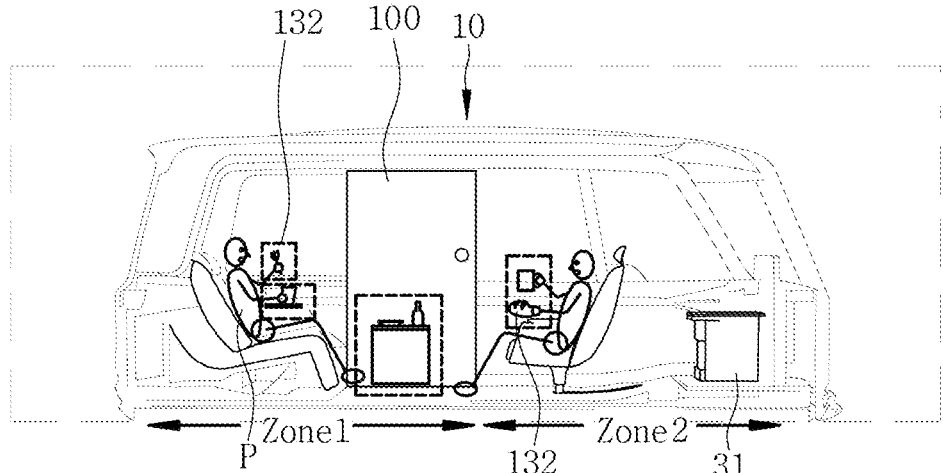
FIG. 41 is an exemplary diagram illustrating a control method of the vehicle when a passenger's food intake is detected in the first zone of the vehicle according to the embodiment of the present disclosure.

As shown in the example of FIG. 41, when the passenger (P) is detected in the first zone and the passenger's (P) behavior of consuming food is detected, the processor 900 determines that the passenger (P) is consuming food while resting, and may control the operation of the vehicle 10 to perform a process of creating an environment in which food may be comfortably consumed. Such a process may include, for example, displaying an image or environment related to food on a display, playing comfortable music, operating a ventilation system (not shown), and the like.

Figure 42:
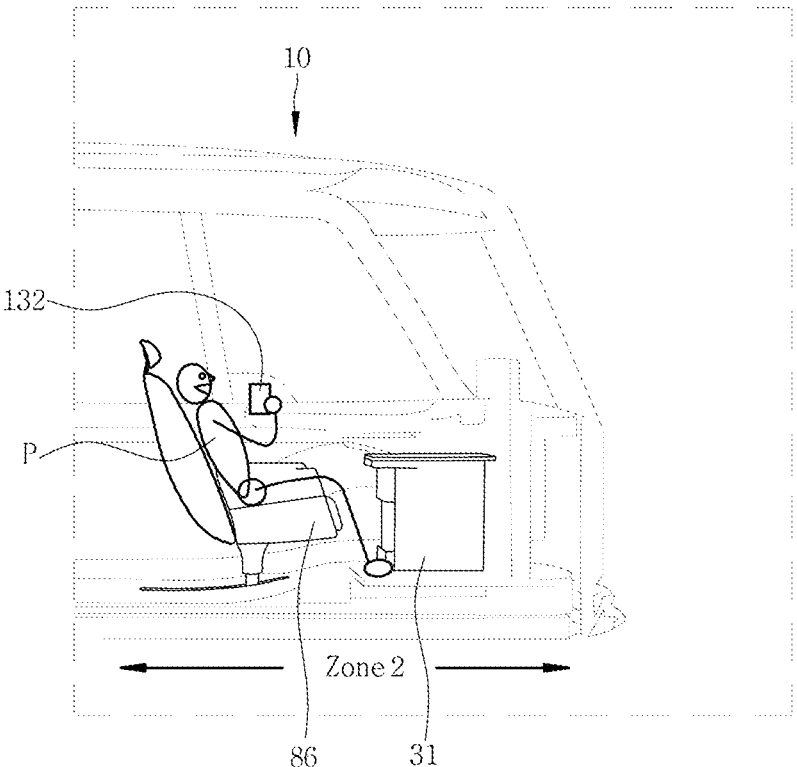
FIG. 42 is an exemplary diagram illustrating a control method of the vehicle when a passenger's food intake is detected in the second zone of the vehicle according to the embodiment of the present disclosure.

As shown in the example of FIG. 42, when the passenger (P) is detected in the second zone and the passenger's (P) behavior of consuming food is detected, the processor 900 may control the operation of the vehicle 10 to perform the safety process. The second zone provides a driving and office environment, so caution may be required when consuming food. When it is detected that the passenger (P) is working in the second zone, a caution message may be output, and when it is detected that the passenger (P) is driving in the second zone, a warning message may be output. In addition, a process of switching a surrounding home appliance (such as a refrigerator) to a lock mode may be further performed.

In addition, in the vehicle 10, the gesture cameras 111 and 118 may detect the behavior of the passenger (P) hitting the chest area (P2) by checking the movement of the hand, or the microphones 101 and 108 may detect frequent sighs.

Figure 43:
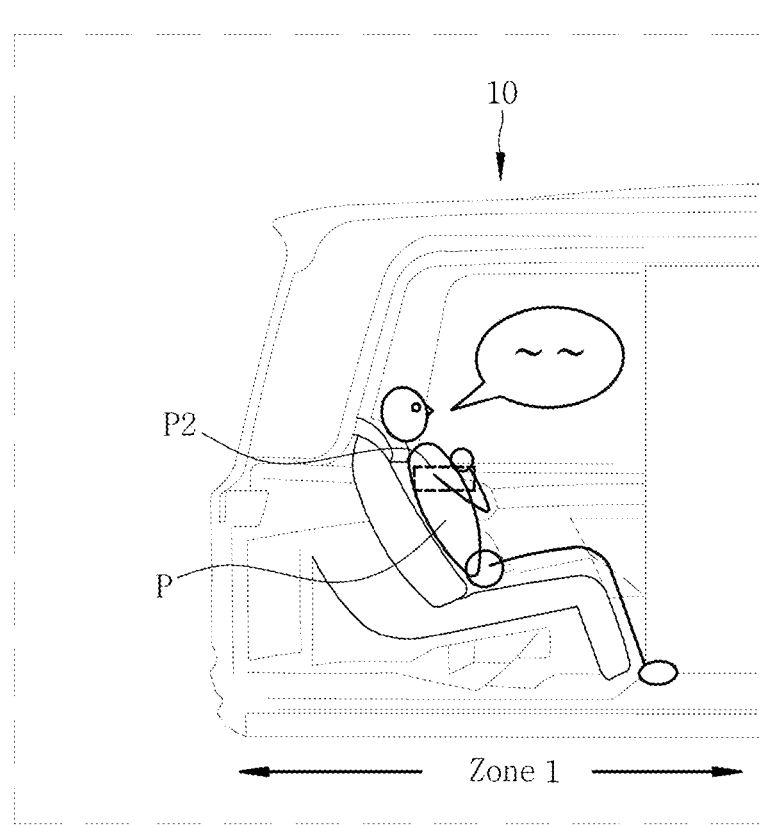
FIG. 43 is an exemplary diagram illustrating a control method of the vehicle when a passenger's discomfort is detected in the first zone of the vehicle according to the embodiment of the present disclosure.

As shown in the example of FIG. 43, when the passenger (P) is detected in the first zone and the passenger (P) is detected hitting the chest or sighing, the processor 900 may determine that the passenger (P) is feeling frustrated and control the operation of the vehicle 10 to proceed with the process of providing cooling. The process of providing cooling may include, for example, at least one of opening the window of the vehicle 10, displaying an image that allows the passenger to feel cool, ventilating the air inside, emitting a scent helpful for respiratory illness, and switching to telemedicine mode and connecting to the hospital.

Figure 44:
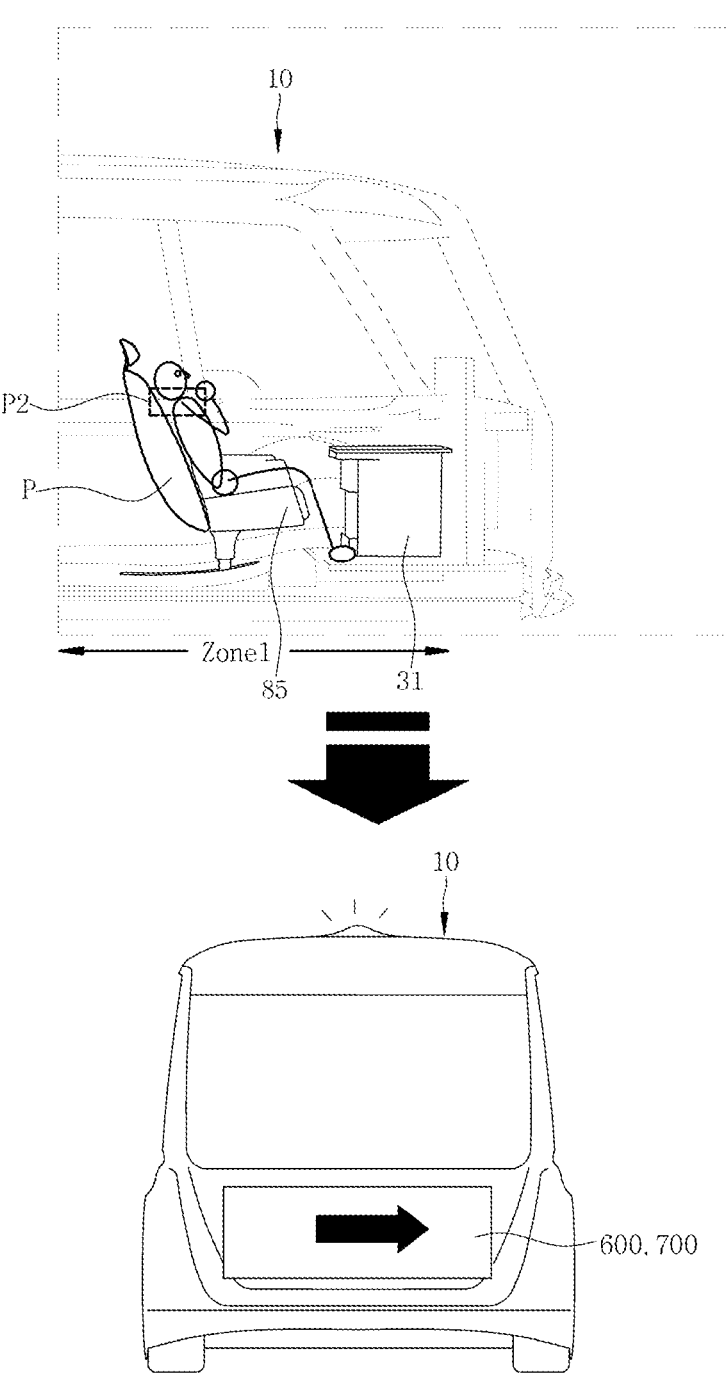
FIG. 44 is an exemplary diagram illustrating a control method of the vehicle when a passenger's discomfort is detected in the second zone of the vehicle according to the embodiment of the present disclosure.

As shown in the example of FIG. 44, when the passenger (P) is detected in the second zone and the passenger (P) is detected hitting the chest or sighing, the processor 900 may determine that the abnormality has occurred and control the operation of the vehicle 10 to perform a process for safety. For example, the process for safety may include at least one of opening a window of the vehicle 10, switching to an autonomous driving mode if the vehicle 10 is an autonomous vehicle, outputting a voice message for recommending a rest by guiding the vehicle to a road shoulder, and displaying safety precautions on the sixth and seventh displays.

In FIGS. 43 and 44, the processor 900 may proceed by referring to heart rate information detected by the sleep tracking camera 114 when performing the process for providing cooling and the process for safety. When the heart rate of the passenger (P) is out of the average range 60 to 100 bpm, the above processes may be performed.

As described above, the control method for the vehicle according to the present disclosure detects and analyzes the position, behaviors, and status of the passenger to control the operation of the vehicle tailored to the passenger. The inner space of the vehicle may be utilized for various purposes such as driving, office space, relaxation space, entertainment space, and the like. Therefore, the vehicle of the present disclosure ensures convenience, enjoyment, and safe traveling for the passenger by recognizing the behavior and status of the passenger and allowing the vehicle to operate in the desired direction.

Although the embodiments of the present disclosure have been described with reference to the accompanying drawings, the present disclosure is not limited to the above embodiments, but may be manufactured in various forms different from each other, and it will be understood by one of ordinary skill in the art that the present disclosure may be practiced in other specific forms without changing the technical spirit or essential features of the present disclosure. Therefore, it should be understood that the embodiments described above are illustrative in all respects and are not limiting.

The invention claimed is:

1. A vehicle, comprising:

a first display disposed in a first direction in an inner space of the vehicle, the inner space being divided into a first zone located in a rear side in a front-rear direction of the vehicle and a second zone located in a front side in the front-rear direction of the vehicle;

a second display disposed in a second direction different from the first direction in the inner space of the vehicle;

a driving part configured to move the first and second displays; and a processor configured to control the driving part and control images to be displayed on the first and second displays, wherein the first display is disposed on a left side portion or a right side portion in the inner space of the vehicle, and the second display is disposed on an upper portion in the inner space of the vehicle, wherein an upper portion of the first display and one side portion of the second display are integrally connected, and wherein the processor is configured to control the driving part to move the first and second displays from the first zone to the second zone when a passenger is detected in the second zone, and to move the first and second displays from the second zone to the first zone when the passenger is detected in the first zone.

2. The vehicle of claim 1, wherein a first image is displayed on the first display and a second image is displayed on the second display, and wherein the second image, which is displayed subsequent to the first image, is displayed as extending the first image.

3. The vehicle of claim 1, further comprising at least one of a third display disposed in the first zone in a third direction, a fourth display disposed in the first zone in the first direction, a fifth display disposed in the second zone in a fourth direction, a sixth display disposed on an outer front portion of the vehicle disposed toward a front of the vehicle, and a seventh display disposed on an outer rear portion of the vehicle toward a rear of the vehicle.

4. The vehicle of claim 3, wherein the third display is disposed on a lower portion of the inner space.

5. The vehicle of claim 3, wherein a third image is displayed on the third display, and the third image, which is displayed subsequent to a first image, is displayed as extending the first image.

6. The vehicle of claim 3, wherein a fourth image is displayed on the fourth display, and the fourth image, which is displayed subsequent to a first image, is displayed as extending the first image.

7. The vehicle of claim 3, wherein a fifth image is displayed on the fifth display, wherein first and second images, which are displayed subsequent to the fifth image, are displayed on the first and second displays respectively, by extending the fifth image, and wherein the fifth display is configured to change a viewable portion of the fifth display by entering or exiting an opening in the vehicle.

8. The vehicle of claim 1, further including first and second sensing parts configured to detect the passenger in the first and second zones, respectively, wherein the processor is further configured to control the driving part to move the first and second displays to the second zone when the first sensing part does not detect the passenger, and the second sensing part detects the passenger.

9. The vehicle of claim 8, wherein the processor is further configured to control the driving part to move the first and second displays to the first zone when the second sensing part does not detect the passenger, and the first sensing part detects the passenger.

10. A control method of a vehicle in which an inner space is divided into a first zone and a second zone, the control method comprising:

standing by of a first display and a second display in the first zone;

inputting operation commands to the first and second displays; and operating the first and second displays according to the operation commands, wherein the first display is disposed on a side portion of the inner space in a first direction, and the second display is disposed on an upper portion of the inner space in a second direction different from the first direction, wherein the first display and the second display are configured to be movable between the first zone and the second zone, wherein the inner space is divided into the first zone located in a rear side in a front-rear direction of the vehicle and the second zone located in a front side in the front-rear direction of the vehicle, wherein an upper portion of the first display and one side portion of the second display are integrally connected, and wherein the first and second displays are moved from the first zone to the second zone when a passenger is detected in the second zone and are moved from the second zone to the first zone when the passenger is detected in the first zone.

11. The control method of claim 10, wherein when an opening of a vehicle door is detected and a request to move the first and second displays is received, the first and second displays are moved from the first zone to the second zone, and after moving to the second zone, when a closing and locking of the vehicle door is detected, the first and second displays are moved from the second zone to the first zone.

12. The control method of claim 10, wherein when a screen display request for the first and second displays is input, a first image is displayed on the first display, and a second image displayed subsequent to the first image is displayed on the second display as extending the first image.

13. The control method of claim 12, wherein a third image is displayed on a third display disposed on a lower portion of the inner space in the first zone in a third direction, and when the first and second displays are disposed in the first zone, the third image displayed subsequent to the first image is displayed on the third display as extending the first image, wherein a fourth image is displayed on a fourth display disposed on the side portion of the inner space in the first zone in the first direction, and when the first and second displays are disposed in the first zone, the fourth image displayed subsequent to the first image is displayed on the fourth display as extending the first image, and wherein a fifth image is displayed on a fifth display disposed in the second zone in a fourth direction different from the first and second directions, and when the first and second displays are disposed in the second zone, the first and second images displayed subsequent to the fifth image are displayed on the first and second displays, respectively, as extending the fifth image.

14. The control method of claim 10, wherein when the passenger located in the inner space is tracked and the passenger moves from the first zone to the second zone, an operation command is input to move the first and second displays from the first zone to the second zone, and when the passenger located in the inner space is tracked and the passenger moves from the second zone to the first zone, an operation command is input to move the first and second displays from the second zone to the first zone.

* * * * *